(12) United States Patent
Cherubini et al.

(10) Patent No.: US 7,245,450 B1
(45) Date of Patent: Jul. 17, 2007

(54) SYNCHRONOUS SERVO CHANNEL FOR LONGITUDINAL POSITION DETECTION AND POSITION ERROR SIGNAL GENERATION IN TAPE DRIVE SYSTEMS

(75) Inventors: Giovanni Cherubini, Rueschlikon (CH); Evangelos S. Eleftheriou, Zurich (CH); Robert A. Hutchins, Tucson, AZ (US); Jens Jelitto, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/340,030

(22) Filed: Jan. 26, 2006

(51) Int. Cl.
*G11B 15/52* (2006.01)

(52) U.S. Cl. .................. 360/73.12; 360/72.3; 360/27

(58) Field of Classification Search .......... 360/73.12, 360/73.14, 72.3, 69, 55, 74.1, 77.12, 27, 360/51, 48; 714/755; 708/203; 375/345; 341/158

See application file for complete search history.

(56) References Cited

U.S. PATENT DOCUMENTS

| | | | |
|---|---|---|---|
| 4,688,225 A | * | 8/1987 | Fukami et al. .............. 714/755 |
| 4,866,636 A | * | 9/1989 | Fukami et al. .............. 708/203 |
| 5,294,791 A | * | 3/1994 | Pahr ............................. 250/548 |
| 5,396,374 A | * | 3/1995 | Kubota et al. ................. 360/27 |
| 5,726,818 A | * | 3/1998 | Reed et al. .................... 360/51 |
| 5,812,336 A | * | 9/1998 | Spurbeck et al. ............. 360/51 |
| 6,239,939 B1 | * | 5/2001 | Bui et al. ................. 360/77.12 |
| 6,329,942 B1 | * | 12/2001 | Nagaraj et al. ............. 341/158 |
| 6,430,238 B1 | * | 8/2002 | Sutardja ..................... 375/345 |
| 6,532,128 B1 | * | 3/2003 | Bui et al. .................. 360/74.1 |
| 6,937,413 B2 | * | 8/2005 | Bui et al. ...................... 360/48 |
| 2004/0120066 A1 | * | 6/2004 | Hashimoto .................... 360/69 |

* cited by examiner

*Primary Examiner*—Fred F. Tzeng
(74) *Attorney, Agent, or Firm*—Dan Shifrin

(57) ABSTRACT

A fully synchronous longitudinal position (LPOS) detection system is provided for improving the reliability of servo channels in tape systems. The system is based on the interpolation of the servo channel output signal, which is sampled by an analog-to-digital converter (ADC) at a fixed sampling rate, using a clock at a nominal frequency, so that interpolated signal samples are obtained at a predetermined fixed rate, independent of tape velocity. This predetermined fixed rate is defined in terms of samples per unit of length, as opposed to samples per unit of time, which is the measure of the ADC sampling rate. The resolution with which the servo channel signal is obtained at the interpolator output is thus determined by the step interpolation distance.

12 Claims, 16 Drawing Sheets

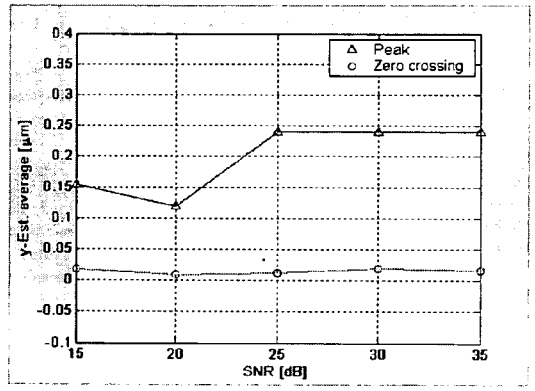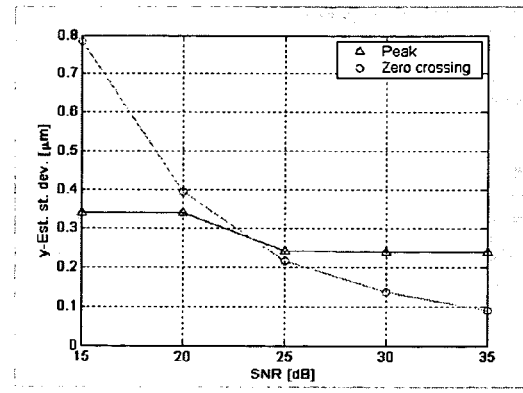
FIG. 20A
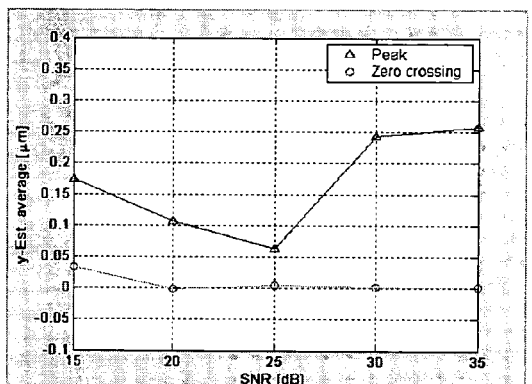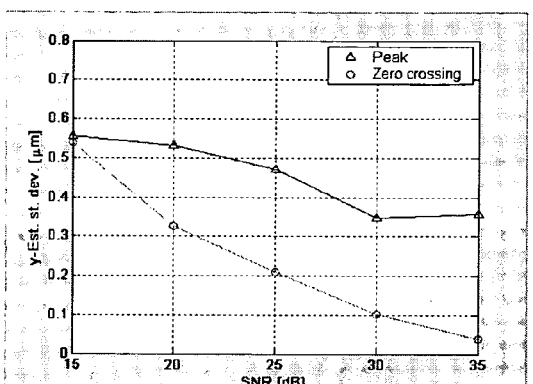
FIG. 20B
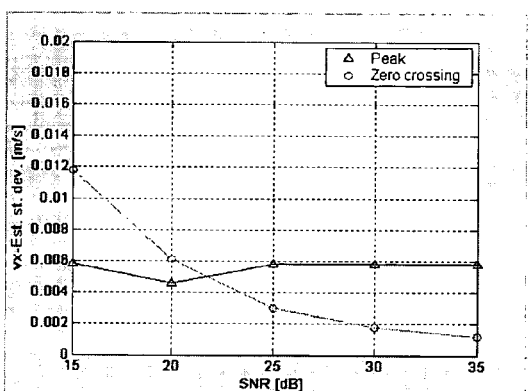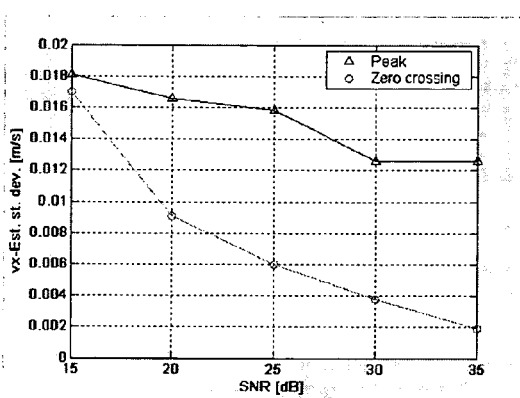
FIG. 21A  FIG. 21B

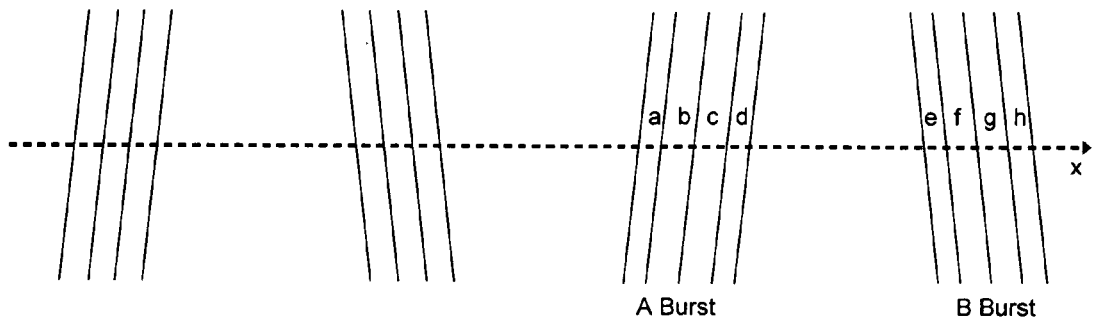
FIG. 22A
| Data Encoded | Conditions | Data Encoded | Conditions |
|---|---|---|---|
| 0 | a>b | 1 | a<b |
| | c<d | | c>d |
| | e>f | | e<f |
| | g<h | | g>h |
FIG. 22B
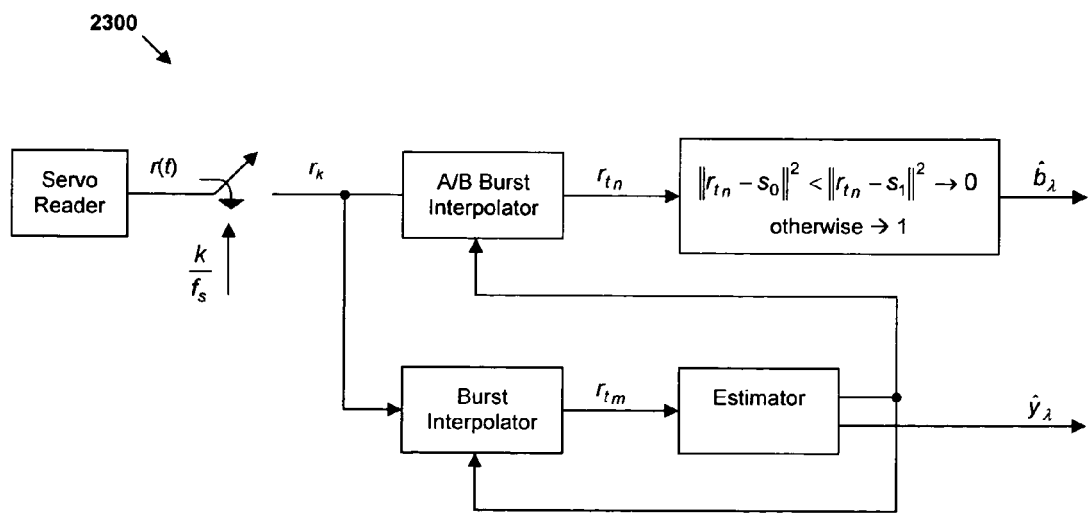
FIG. 23

SYNCHRONOUS SERVO CHANNEL FOR LONGITUDINAL POSITION DETECTION AND POSITION ERROR SIGNAL GENERATION IN TAPE DRIVE SYSTEMS

TECHNICAL FIELD

The present invention relates generally to servo channel architecture in a magnetic tape storage system and, in particular, to a synchronous servo channel architecture.

BACKGROUND ART

Timing-based servo (TBS) is a technology developed specifically for linear tape drives in the late '90s. In TBS systems, recorded servo patterns consist of transitions with two different azimuthal slopes, and head position is derived from the relative timing of pulses generated by a narrow head reading the pattern. TBS patterns also allow the encoding of additional longitudinal position (LPOS) information without affecting the generation of the transversal position error signal (PES). This is obtained by shifting transitions from their nominal pattern position, as shown in FIG. 1. In tape systems there are typically available two dedicated servo channels from which LPOS information as well as PES can be derived. The timing-based track-following servo for linear tape systems has been adopted by the linear tape open (LTO) consortium as a standard for the so-called LTO tape drive systems.

Usually, the detection of LPOS information is based on the observation of the shifts of the peaks of the dibit signal samples at the servo-channel output. This approach has the following severe limitations:

a) The A/D converter sampling frequency has to change with the tape velocity if a constant rate expressed in number of samples per micrometer that is independent of tape velocity is desired. If a fixed sampling frequency is adopted, the rate depends on the tape velocity.

b) A consequence of the choice of a fixed sampling rate is that the number of samples per dibit response at the LPOS detector (peak detector) is variable depending on the velocity.

c) No reliable LPOS detection is possible during acceleration and deceleration, i.e., during the phase at which the velocity is changing towards the target velocity.

d) Peak detection is not the optimum detection scheme for the LPOS pattern, which is generated using pulse position modulation (PPM) techniques.

e) There is no possibility to monitor the time evolution of the signal at the output of the servo channel since there is no time reference.

f) There is no possibility to have a measure of reliability of the LPOS detection process.

In order to support sufficient resolution at high velocities using prior art LPOS asynchronous architecture, illustrated in FIG. 2, higher ADC sampling rates are required. For example, if the highest target velocity is v=12.5 m/s, then a resolution of 0.83 μm is obtained assuming an ADC sampling rate of 15 MHz. Clearly, such a resolution is not adequate when one wants to resolve LPOS pulse position modulation of +/−0.25 μm. In particular, a sampling rate of 250 MHz would be required to obtain a resolution of 0.05 μm using the asynchronous approach.

SUMMARY OF THE INVENTION

The present invention provides a fully synchronous longitudinal position (LPOS) detection system for improving the reliability of servo channels in tape systems. The present invention is based on the interpolation of the servo channel output signal, which is sampled by an analog-to-digital converter (ADC) at a fixed sampling rate, using a clock at a nominal frequency, so that interpolated signal samples are obtained at a predetermined fixed rate, independent of tape velocity. This predetermined fixed rate is defined in terms of samples per unit of length, as opposed to samples per unit of time, which is the measure of the ADC sampling rate. The resolution with which the servo channel signal is obtained at the interpolator output is thus determined by the step interpolation distance.

BRIEF DESCRIPTION OF THE DRAWINGS

FIGS. 20A and 20B illustrate plots of the mean and standard deviation of the y-position estimate for v=6 m/s and for v=12 m/s, respectively;

FIGS. 21A and 21B illustrate plots of the standard deviation of the tape velocity estimate for v=6 m/s and for v=12 m/s, respectively;

FIG. 22 are an illustration and table, respectively, of the majority decoding rule for LPOS symbols based on peak detection;

FIG. 23 illustrates a block diagram of an optimum LPOS detection system;

DETAILED DESCRIPTION OF THE PREFERRED EMBODIMENT

Synchronous Servo Channel Architecture

With the architecture of the present invention, the dynamic interpolator allows any sampling rate at the detector input, with the only limitation arising because of potential aliasing effects. For example, in the case of a distance between magnetic transitions given by $L_p$=2.1 μm, the maximum velocity achievable without aliasing effects with a 15 MHz fixed ADC clock is $v_{max}$=2.1×(15/2)=15.75 m/s. In this case the equivalent sampling frequency after the burst interpolator for achieving a resolution of 0.05 μm is equal to 315 MHz. Note that this would be the required fixed sampling frequency in an asynchronous architecture.

Figure 3:
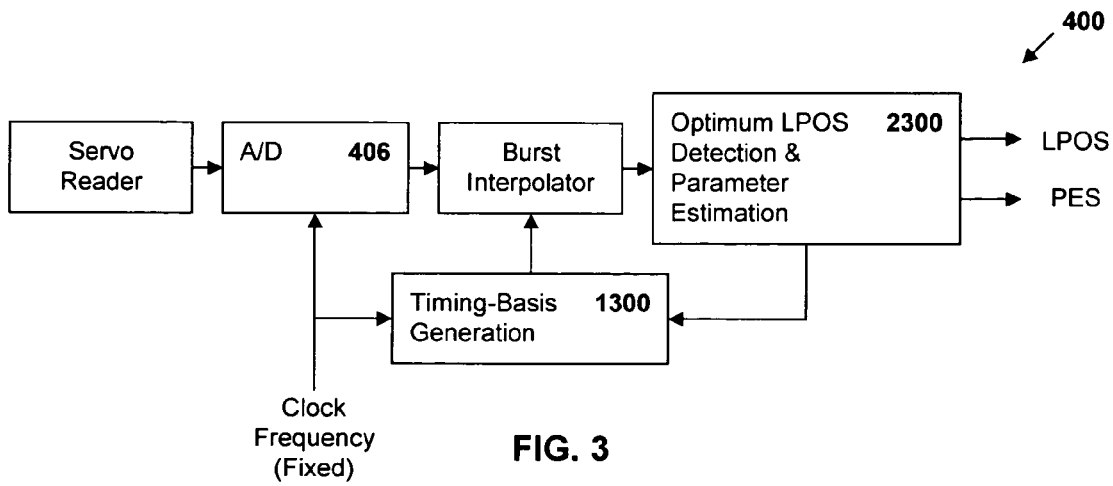
FIG. 3 illustrates a block diagram of an LPOS synchronous architecture of the present invention.

FIG. 3 illustrates the basic building blocks of the synchronous LPOS detection architecture 400 of the present invention. Because the number of samples per unit of length is fixed and independent of velocity after the burst interpolator, a matched filter approach can be employed for optimum detection of PPM in the presence of noise. The matched filter will have a fixed number of samples per unit length. Furthermore, the position-error signal and the velocity estimate may be obtained by measuring the distance between the zero crossings of the individual dibits of the timing-based servo bursts. Reliable position-error signal generation, velocity estimation, and LPOS detection is achieved during ramp-up, ramp-down, and for any constant tape velocity up to a maximum velocity, which as a first approximation is given by $$v_{max} = L_p \times (f_s/2), \quad (1)$$

where $L_p$ is the minimum distance between magnetic transitions, expressed in μm, and $f_s$ is the fixed sampling rate of the ADC, expressed in MHz. Monitoring of the signal-to-noise plus distortion ratio for servo-channel selection can also be supported.

Figure 4:
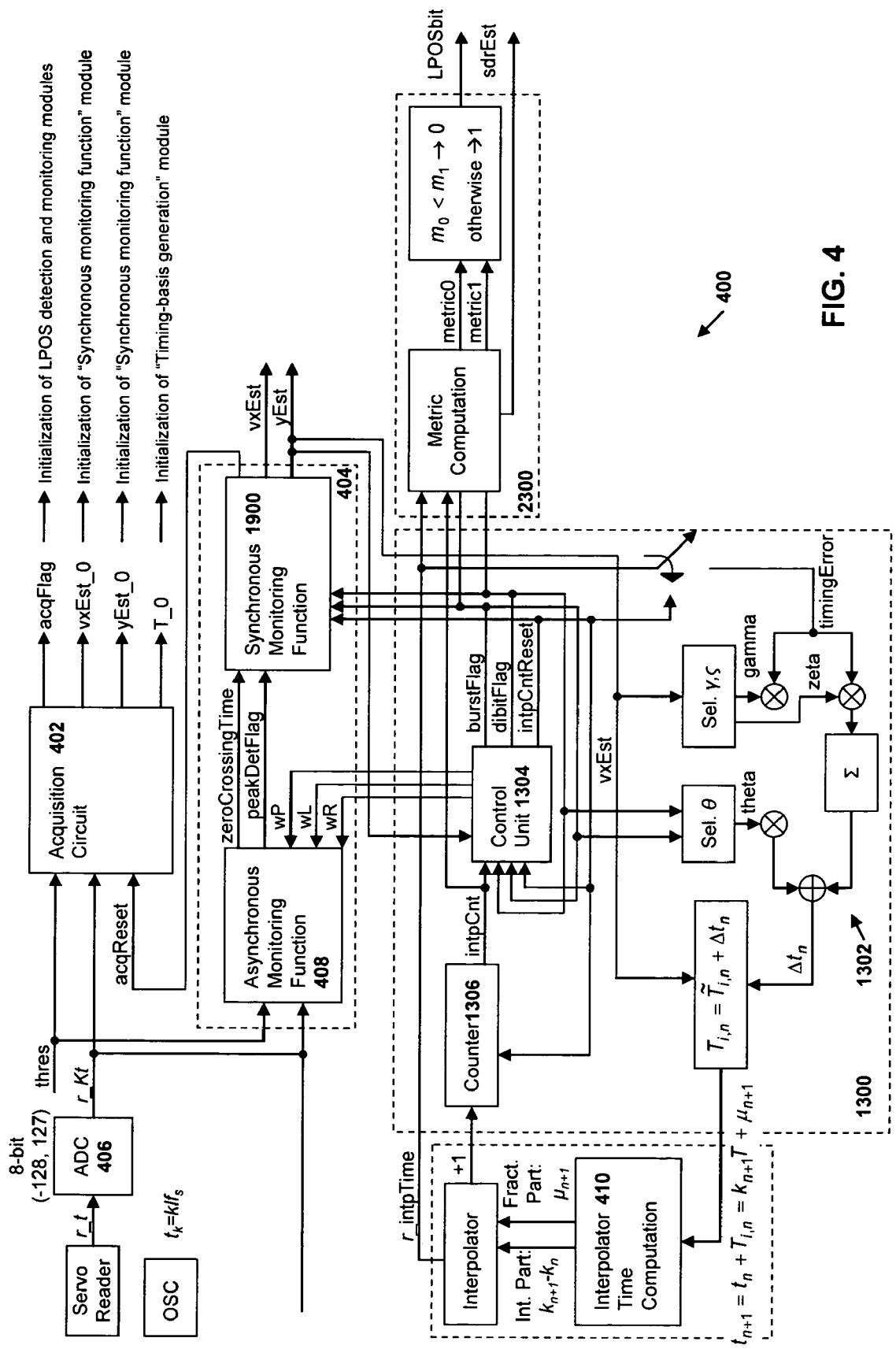
FIG. 4 illustrates a block diagram of the synchronous servo channel in which the present invention may be implemented.

FIG. 4 shows a more detailed block diagram of the synchronous servo channel 400. The initial acquisition of synchronous servo channel parameters is performed by the acquisition circuit 402. The tape velocity and y-position estimates as well as the monitoring of the servo channel operation are provided by the parameter estimation block 404. The instants at which interpolated signal samples must be generated so that they are obtained at a predetermined fixed rate, independent of tape velocity, are determined by the timing-basis generation block 1300. Finally, LPOS symbol decisions are yielded by the optimum LPOS detection block 2300.

Initial Acquisition of Synchronous Servo Channel Parameters

One of the main challenges for the design of a synchronous servo channel is the determination of the initial time instant and nominal step interpolation interval for the generation of the timing basis underlying signal interpolation. The nominal step interpolation interval $T_i$, expressed in microseconds, which is the time it takes for the tape to travel over the nominal step interpolation distance $x_i$, expressed in micrometers, is given by $$T_i = \frac{x_i}{v}, \quad (2)$$

where v denotes the tape velocity in m/s. Furthermore, for optimum LPOS symbol detection based on matched filtering, knowledge of the transversal (y) position of the servo reader is also needed. As a result of the initial acquisition process, besides the initial time instant and nominal step interpolation interval, it is therefore necessary to obtain reliable estimates of the tape velocity and of the y-position.

Figure 1:
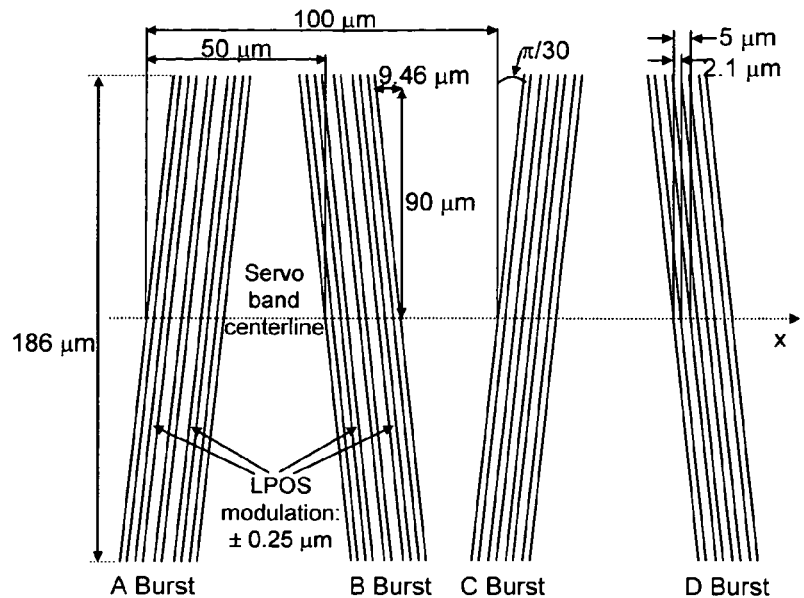
FIG. 1 illustrates the LTO specification of servo bursts with embedded LPOS information.
Figure 2:
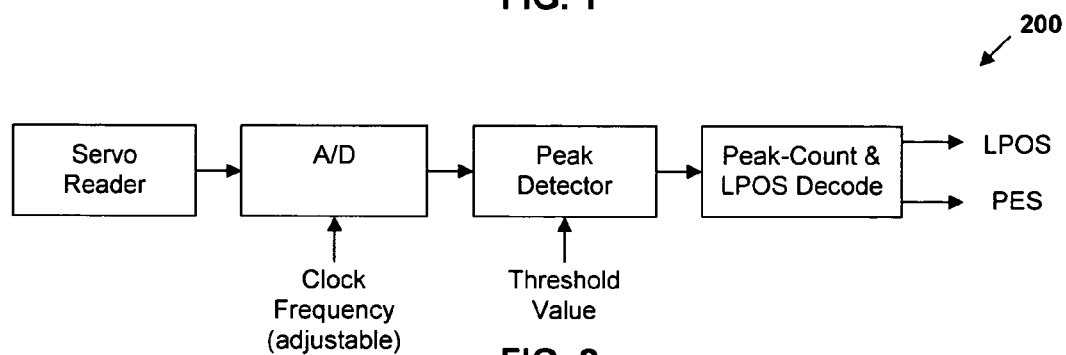
FIG. 2 illustrates a block diagram of prior art LPOS asynchronous detection architecture.

Initial acquisition should be performed using the sequence of analog-to-digital converter (ADC) output signal samples without any prior knowledge of tape velocity or y-position. Therefore, it is important to devise a method that accomplishes reliable initial acquisition of channel parameters for a wide range of tape velocities, typically in the range from 0.5 m/s to 12.5 m/s for LTO tape drive systems. As the sampling frequency of the ADC is fixed and typically in the range from 15 MHz to 24 MHz, several samples per dibit of a servo burst will be obtained in the case of low tape velocity, whereas only few samples per dibit of a servo burst will be presented to the acquisition circuit in the case of high tape velocity. As no timing information at the beginning of initial acquisition is available, the acquisition method will rely on the observation of the peaks of the dibits of the servo bursts. Usually, a positive or negative peak of a dibit of a servo burst is detected if the absolute value of a channel output signal sample exceeds a given threshold value. Therefore in the case of low velocity the acquisition method must have the capability to detect a unique peak even though several consecutive signal samples from a single dibit exceed the threshold. In the case of high velocity it must cope with the event that no signal sample from either the positive or the negative peak of a dibit exceeds the threshold. Note that a servo frame is identified by a sequence of C, D, A, and B servo bursts, as illustrated in FIG. 1.

The present invention also provides for the initial acquisition of the synchronous servo channel parameters based on the identification of a valid sequence of [4 4 5 5] bursts in a servo frame. This is achieved via coarse estimation of the time interval between positive and negative peaks of a dibit in a servo burst.

Figure 5:
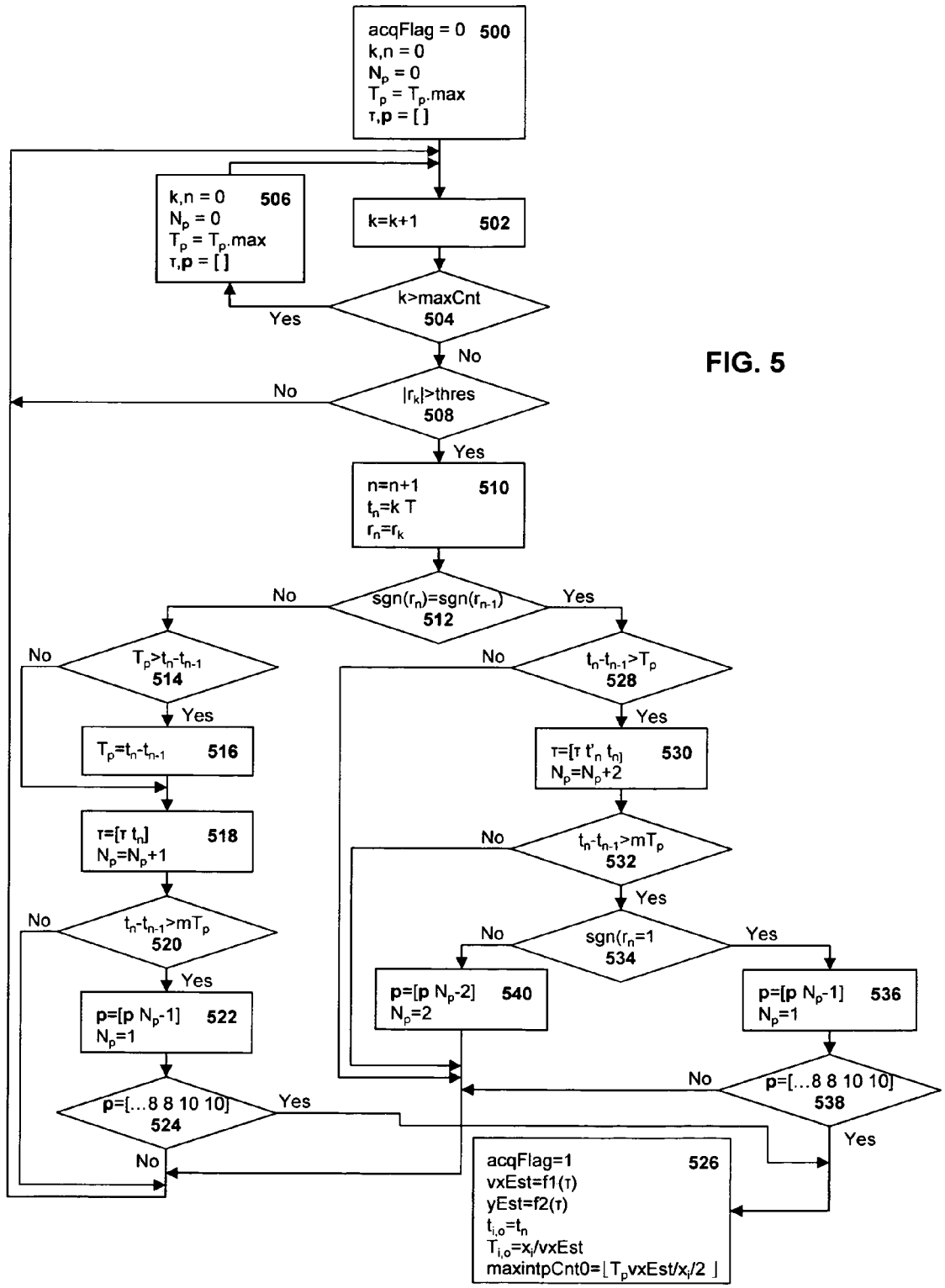
FIG. 5 is a flow chart describing the initial acquisition process.

A flow chart describing the method for initial acquisition is shown in FIG. 5. At the beginning of the acquisition process, the following variables and arrays are initialized (step 500):

a) acqFlag=0, acquisition flag indicating that the synchronous servo channel is in acquisition mode;

b) k=0, counter incremented by one at each sampling instant;

c) n=0, index incremented by one every time the absolute value of a signal sample exceeds a given threshold value denoted by thres;

d) $N_p=0$, number of dibit peaks, both positive and negative, detected within a servo burst;

e) $T_p=T_{p,max}$, coarse estimate of the time interval between the two peaks of a dibit; the initial value $T_{p,max}$ is chosen so that the time interval between dibit peaks is smaller than $T_{p,max}$ for all tape velocities in a given range;

f) $\tau=[\ ]$, vector whose elements are given by the peak arrival times;

g) $p=[\ ]$, vector whose elements are given by the number of detected peaks within servo bursts.

At each sampling instant, the counter is incremented by one (step 502) and compared with a given maxCnt value (step 504): if the counter exceeds maxCnt, a timeout period expires (step 506) and the acquisition process is restarted. Otherwise, the absolute value of the signal sample at time k, denoted by $|r_k|$, is compared with the given threshold value (step 508). If $|r_k|$ exceeds the threshold, there is a high probability the signal sample has been obtained in correspondence of the peak of a dibit, either positive or negative. In this case the index n is incremented by one, and the n-th peak arrival time and signal sample are stored as $t_n=kT$ and $r_n=r_k$, respectively, (step 510) where T denotes the fixed sampling interval. As mentioned above, it is necessary to determine whether a signal sample whose absolute value exceeds the threshold belongs to an already detected peak or to a new peak. For this purpose, the sign of $r_n$ is compared with the sign of the previous sample whose absolute value exceeded the threshold, given by $sgn(r_{n-1})$ (step 512).

If $sgn(r_n)\neq sgn(r_{n-1})$, with there is a probability the two samples belong to distinct peaks. The time interval between the two samples, $t_n-t_{n-1}$, is compared with the current estimate of the time interval between the peaks of a dibit (step 514). If $T_p>t_n-t_{n-1}$, then the estimate is updated and given the new value $T_p=t_n-t_{n-1}$ (step 516). Note that in the course of the acquisition process $T_p$ monotonically decreases towards a value that yields the desired estimate of the time interval between the peaks of a dibit. As $t_n$ is the arrival time of a new peak, its value is appended to the vector $\tau$, and the peak count $N_p$ is incremented by one (step 518). At this point it is necessary to decide whether the new peak belongs to a dibit of the currently considered servo burst or to a dibit of a new burst. For this purpose, the time difference $t_n-t_{n-1}$ is compared with the value $mT_p$ (step 520), where m is a constant chosen so that, assuming $T_p$ is equal to the nominal interval between peaks of a dibit, the time interval between peaks of consecutive dibits in the same burst is smaller than $mT_p$, whereas the time interval between peaks of consecutive dibits in different bursts is greater than $mT_p$, for all tape velocities and all transversal positions of the servo reader. If $t_n-t_{n-1}>mT_p$, a new burst is detected, the value $N_p-1$ of the number of peaks that have been detected in the previous burst is appended to the vector p, and the peak count $N_p$ for the current burst is initialized to one (step 522). It remains now to verify whether the last four elements of the vector p correspond to the desired sequence of number of peaks in the servo bursts of a servo frame, which is [8 8 10 10] (step 524). In the affirmative case, a sequence of [4 4 5 5] bursts, which corresponds to sequence [C D A B] of servo bursts (see FIG. 1), is identified and the initialization parameters to start synchronous servo channel operation can be computed (step 526). Otherwise the acquisition process continues with the next sampling interval (step 502).

If $sgn(r_n)=sgn(r_{n-1})$, two cases must be considered. If $T_p \geq t_n-t_{n-1}$ (step 528), with high probability the two samples belong to the same peaks, no actions are taken to update the vectors $\tau$ and p and the variable $N_p$, and the acquisition process continues with the next sampling interval (step 502). If $T_p<t_n-t_{n-1}$, with high probability the two samples are obtained from peaks of the same polarity that belong to consecutive dibits, a missed peak detection event has occurred. In this case, two peak arrival time values are appended to the vector $\tau$, denoted by $t'_n$ and $t_n$, and the peak count $N_p$ is incremented by two (step 530). The estimate of the arrival time $t'_n$ of the missed peak is obtained from the knowledge of the polarity of the missed peak, the estimate $T_p$ of the time interval between peaks of a dibit, and the direction of motion of the tape. For forward tape motion, at the output of the servo channel the dibit peak with positive polarity is obtained first, whereas for reverse tape motion the peak with negative polarity is obtained first. Therefore, if the tape is moving in forward direction and the polarity of the missed peak is negative, or if the tape is moving in reverse direction and the polarity of the missed peak is positive, the missed peak arrival time is estimated as $t'_n=t_{n-1}+T_p$, otherwise it is estimated as $t'_n=t_n-T_p$. As already discussed above, at this point it is necessary to decide whether the new peak belongs to a dibit of the currently considered servo burst or to a dibit of a new burst (step 532). If $t_n-t_{n-1}>mT_p$, a new burst is detected, and again it is necessary to consider the direction of tape motion to determine the next steps (step 534). In the flow chart of FIG. 5, forward direction of tape motion is assumed. A similar procedure can be applied for the case of reverse direction. If the detected peak has positive polarity, this corresponds with high probability to the first peak of the new burst. Then the value $N_p-1$ is appended to the vector p and the peak count $N_p$ for the current burst is initialized to one (step 536). The last four elements of the vector p are then checked for the sequence [8 8 10 10] (step 538). On the other hand, if the detected peak has negative polarity, there is a high probability that the first peak of the new burst has been missed. Then the value $N_p-2$ is appended to the vector p, and the peak count $N_p$ for the current burst is initialized to two (step 540). Note that in this case the last four elements of the vector p are not checked for the sequence [8 8 10 10], as the transition from "acquisition" mode to "tracking" mode is assumed to take place at the detection of the first peak of the first dibit of a "C burst" (see FIG. 1) to reduce the implementation complexity of the acquisition system.

Figure 6:
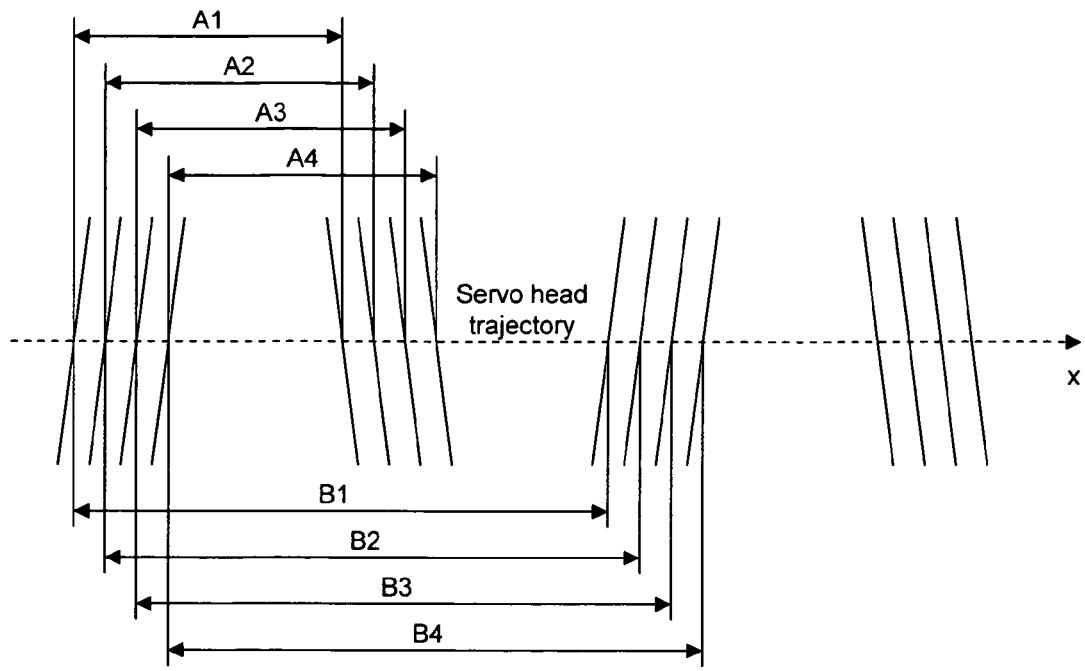
FIG. 6 is a plot of the intervals between peak arrival times for the computation of tape velocity and y-position estimates.

As soon as the sequence [8 8 10 10] is detected in the last four elements of the vector p, the various parameters that are needed for starting synchronous channel operation are computed and the variable acqFlag is set to 1 (step 526) to indicate the successful completion of the acquisition process. Assuming the peak arrival times of C, D, and A bursts are considered for the computation of the tape velocity and y-position estimates, as illustrated in FIG. 6, the desired estimates are given by $$y_{est,0} = -\frac{\lambda}{2\tan\left(\frac{\pi}{30}\right)}\left(\frac{A1+A2+A3+A4}{B1+B2+B3+B4} - \frac{50}{\lambda}\right), \text{ and} \quad (3)$$

$$v_{est,0} = \frac{4\lambda f_s}{B1+B2+B3+B4}, \quad (4)$$

respectively, (step 526) where $\lambda=100$ µm for forward tape motion and $\lambda=95$ µm for reverse tape motion. Upon completion of the acquisition process, the synchronous servo channel operation starts with initial time instant $t_{i,0}=t_n$ and nominal step interpolation interval is set to $T_{i,0}=x_i/v_{est,0}$ for the generation of the timing basis underlying signal interpolation (step 526). The acquisition process also provides a parameter given by $$IntpStep0 = \left\lfloor \frac{T_p v_{est,0}}{2x_i} \right\rfloor, \quad (5)$$

where $\lfloor z \rfloor$ denotes the largest integer smaller than or equal to z. This parameter indicates the estimated number of interpolation steps, in multiples of $x_i$, that separate the current sample from the sample corresponding to the zero crossing of the first dibit in the C burst, which will be used for the first timing adjustment by the timing recovery loop.

In the realization of the acquisition circuit 402, the vectors τ and p are implemented as delay lines of length 36 and 4, respectively. Also note that the latency introduced by the circuitry for the computation of the estimates should be smaller than the time gap between servo bursts. Moreover, in order to obtain reliable tape velocity and y-position estimates it is necessary to implement a circuit that performs the division between positive numbers with high accuracy. The above requirements are satisfied by applying the Newton-Raphson's algorithm for the computation of the reciprocal of the divisor by iterative approximation, and then obtaining the desired quotient by multiplication of the dividend and the reciprocal of the divisor. For example, the relative error in the computation of the division is smaller than 0.4% after three iterations of the algorithm, and it becomes smaller than $1.6 \times 10^{-5}$ after four iterations.

The performance of the described acquisition method has been investigated by simulations. Assuming the Lorentzian model, the magnetic-tape recording channel response to a single transition is represented by $$\Theta(t; v) = \frac{e}{\pi} \frac{1}{1 + \left(\frac{2vt}{PW50}\right)^2}, \quad (6)$$

where the parameter PW50/2 denotes the distance, expressed in micrometers, between points on a magnetic tape, moving with velocity v, that are on a line parallel to the servo band centerline, and at which the servo reader produces the maximum value of the channel response to a single transition and half of the maximum value, respectively. Therefore, the dibit signal pulse is given by $$g(t;v) = \Theta(t;v) - \Theta(t - t_\Theta; v), \quad (7)$$

where $T_\Theta = L_p/v$ μs, and $L_p$ denotes the distance between magnetic transitions. Recall that, in the case of dibits within servo frames that are generated as shown in FIG. 1, $L_p = 2.1$ μm.

Figure 7:
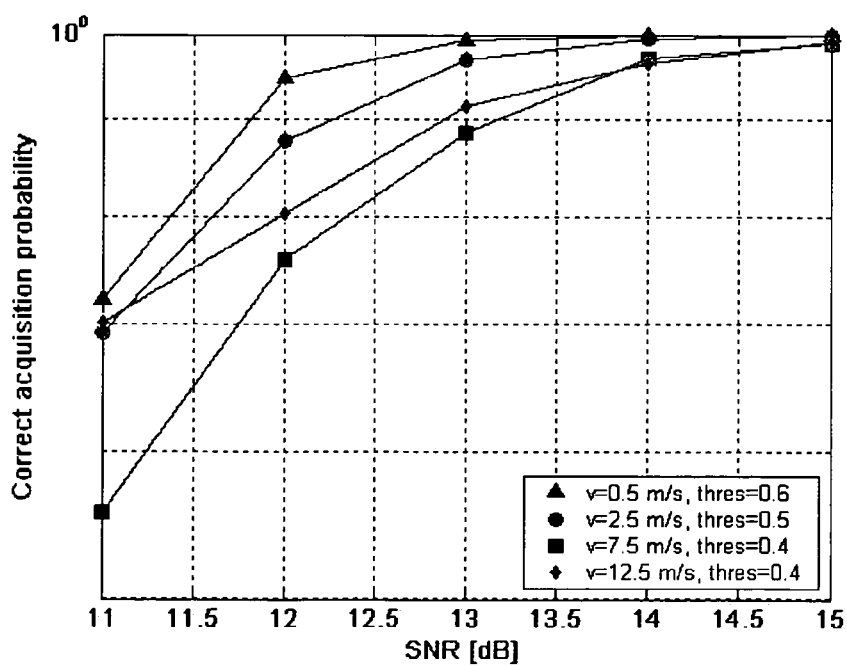
FIG. 7 is a plot of the probability of correct acquisition.
Figure 8:
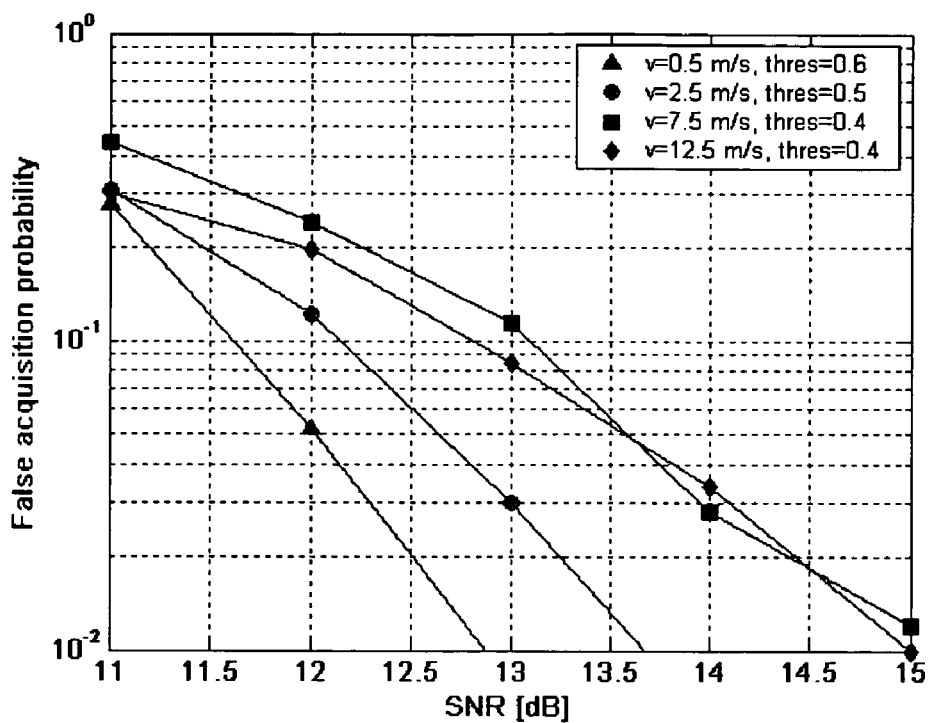
FIG. 8 is a plot of the probability of false acquisition.
Figure 9:
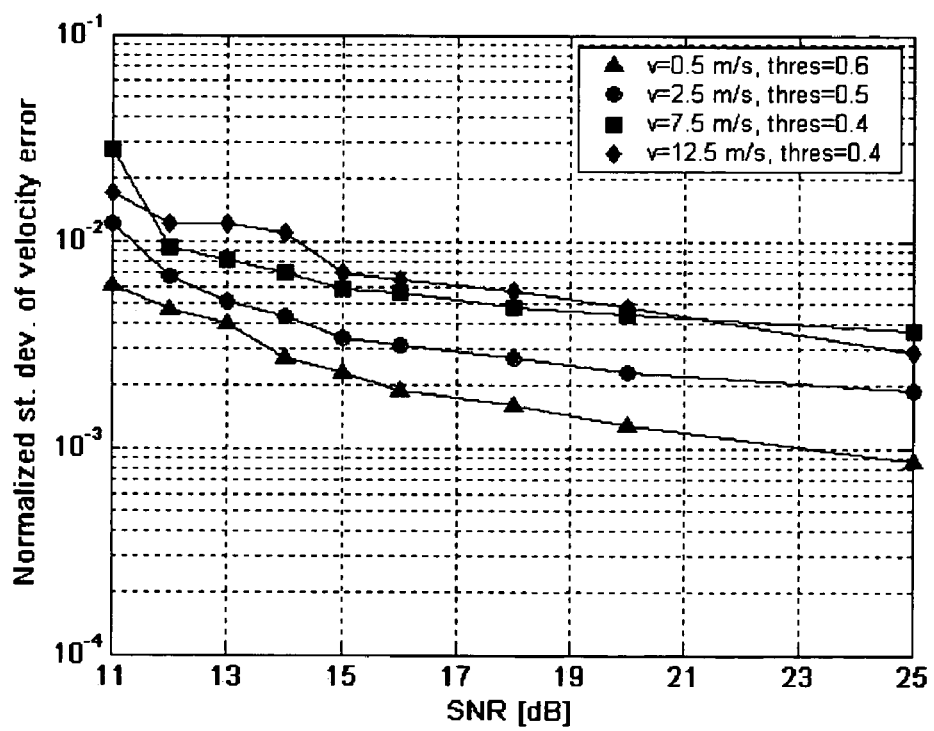
FIG. 9 is a plot of a normalized standard deviation of velocity error relative to the signal-to-noise ratio at the servo channel output.
Figure 10:
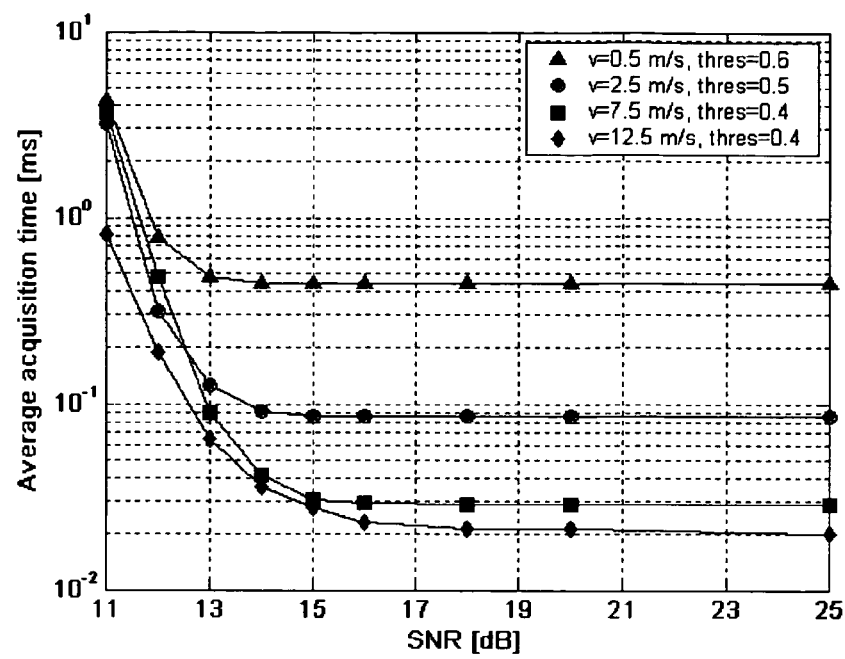
FIG. 10 is a plot of an average acquisition time relative to the signal-to-noise ratio at the servo channel output.

The probabilities of correct acquisition and false acquisition are shown in FIGS. 7 and 8, respectively, for various values of tape velocity and given threshold for peak detection, as a function of the signal-to-noise ratio (SNR) at the servo channel output. Correct acquisition is declared if the absolute value of the error on the initial y-position estimate is smaller than 2.5 μm, otherwise false acquisition is declared. Each probability value has been obtained by 500 realizations of the acquisition process, assuming a Lorentzian channel with PW50/2.1 μm=0.4 for the generation of the servo bursts, additive white Gaussian noise, sampling frequency of the ADC equal to 15 MHz, constant tape velocity, and y-position equal to zero. The normalized standard deviation of the error on the initial tape velocity estimate given correct acquisition, where the normalization factor is given by the tape velocity, and the average acquisition time given correct acquisition are shown in FIGS. 9 and 10, respectively, for various values of tape velocity. In FIG. 9 and FIG. 10, the four curves of both have been plotted for values of the tape velocity in the range from 0.5 m/s to 12.5 m/s.

Generation of the Timing Basis for Signal Interpolation

Synchronous operation of the servo channel requires the generation of a timing basis for signal interpolation, so that interpolated signal samples are obtained at a predetermined fixed rate of $1/x_i$ samples per micrometer, where $x_i$ denotes the nominal step interpolation distance, independent of tape velocity. For example, if $x_i = 0.05$ μm, the rate $1/x_i$ is equal to 20 samples per micrometer. The natural reference for the generation of the timing basis is provided by the servo bursts, which periodically appear at the servo channel output, as illustrated in FIG. 1. Therefore the signal at the servo channel output may be regarded as a pilot signal, from which it is possible to extract timing information. The extraction of timing information from the servo channel signal, however, is not straightforward, as the A, B, C, D servo bursts are not equally spaced. Moreover, the spacing between the servo bursts depends on the y-position of the servo reader, and the period of repetition of the servo frames, as well as the time interval between consecutive dibits within a servo burst, depend on the tape velocity. Furthermore, it is necessary to take into account the presence of pulse position modulation for the encoding of LPOS information in the A and B bursts. For tape motion in the forward direction, the servo channel signal is given by $$r(t) = s(t; \tau, y, v, b) + w(t) = \quad (8)$$

$$\sum_{k=0}^{K_F - 1} \{q_0(t - kT_F - \tau; y, v) + q_1(t - kT_F - \tau; y, v) +$$

$$q_2(t - kT_F - \tau; y, v, b_k) + q_3(t - kT_F - \tau; y, v, b_k)\} + w(t),$$

where τ denotes the timing phase to be recovered, the vector b represents the sequence of LPOS symbols that belong to the binary alphabet $\{0, 1\}$, w(t) is additive white Gaussian noise with spectral density $N_0$, $K_F$ is the number of servo frames in the servo channel signal, $q_i(\cdot)$, i=0,K,3, denote the C, D, A, B servo bursts, respectively. Defining $a_k = 2b_k - 1$, $a_k \in \{-1, +1\}$, the servo bursts can be expressed as $$q_0(t; y, v) = \sum_{i=0}^{3} g\left(t - \frac{y}{v\tan(\pi/30)} - iT_d; v\right),$$

$$q_1(t; y, v) = \sum_{i=0}^{3} g\left(t + \frac{y}{v\tan(\pi/30)} - iT_d - \frac{T_F}{4}; v\right),$$

$$q_2(t; y, v, b_k) = \sum_{\substack{i=0, \\ i\ even}}^{4} g\left(t - \frac{y}{v\tan(\pi/30)} - iT_d - \frac{T_F}{2}; v\right) +$$

$$\sum_{\substack{i=1, \\ i\ odd}}^{3} g\left(t - \frac{y}{v\tan(\pi/30)} - (i + \zeta(i-2)a_k)T_d - \frac{T_F}{2}; v\right),$$

$$q_3(t; y, v, b_k) = \sum_{\substack{i=0, \\ i\ even}}^{4} g\left(t + \frac{y}{v\tan(\pi/30)} - iT_d - \frac{3T_F}{4}; v\right) +$$

$$\sum_{\substack{i=1, \\ i\ odd}}^{3} g\left(t - \frac{y}{v\tan(\pi/30)} - (i + \zeta(i-2)a_k)T_d - \frac{3T_F}{4}; v\right),$$

(9)

where $T_F = L_F/v$ μs, $T_d = L_d/v$ μs, $\xi = 0.05$, and $g(t;v)$ denotes a dibit signal pulse, which depends on the tape velocity $v$, as defined in (7). Recall that $L_F = 200$ μm and $L_d = 5$ μm, as illustrated in FIG. 1. For tape motion in the reverse direction, the signal $r(t)$ can be expressed in a similar manner as (8), provided the coefficients multiplying the term $T_F$ in the definition of the A and B bursts are chosen as $95/200$ and $145/200$ instead of $1/2$ and $3/4$, respectively.

To determine an estimate of the timing phase, classical timing recovery methods would rely on first determining the likelihood function, then averaging it over the unwanted random variables, and finally finding the value of the timing phase that maximizes the resulting function. Observing (8) and (9), it is found that the likelihood function depends on the timing phase, the y-position of the servo reader, the tape velocity, and the sequence of LPOS binary symbols. Then the likelihood function can be expressed as $$L_{\tau,y,v,a}(\varepsilon, \eta, v, \beta) = \exp\left\{\frac{2}{N_0} \int_0^{K_F T_F} r(t) s(t; \varepsilon, \eta, v, \beta) dt\right\} = \quad (10)$$

$$\exp\Biggl\{\frac{2}{N_0} \sum_{k=0}^{K_F - 1 K_F T_F} \int_0^{K_F T_F} r(t) \Biggl[\sum_{i=0}^{3} g\left(t - kT_F - \varepsilon - \frac{\eta}{v\tan(\pi/30)} - iT_d; v\right) +$$

$$\sum_{i=0}^{3} g\left(t - kT_F - \varepsilon + \frac{\eta}{v\tan(\pi/30)} - iT_d - \frac{T_F}{4}; v\right) +$$

$$\sum_{\substack{i=0, \\ i\ even}}^{4} g\left(t - kT_F - \varepsilon - \frac{\eta}{v\tan(\pi/30)} - iT_d - \frac{T_F}{2}; v\right) +$$

$$\sum_{\substack{i=1, \\ i\ odd}}^{3} g\left(t - kT_F - \varepsilon - \frac{\eta}{v\tan(\pi/30)} - (i + \xi(i-2)a_k)T_d - \frac{T_F}{2}; v\right) +$$

$$\sum_{\substack{i=0, \\ i\ even}}^{4} g\left(t - kT_F - \varepsilon + \frac{\eta}{v\tan(\pi/30)} - iT_d - \frac{3T_F}{4}; v\right) +$$

$$\sum_{\substack{i=1, \\ i\ odd}}^{3} g\Biggl(t - kT_F - \varepsilon + \frac{\eta}{v\tan(\pi/30)} -$$

$$(i + \xi(i-2)a_k)T_d - \frac{3T_F}{4}; v\Biggr)\Biggr] dt\Biggr\}.$$

Introducing the matched filter with impulse response $g_M(t;v)=g(-t;v)$, and defining the convolution integral $h(t;v)=r*g_M(t;v)$, the expression of the likelihood function becomes $$L_{\tau,y,v,\alpha}(\varepsilon, \eta, v, \beta) = \exp\left\{\frac{2}{N_0}\sum_{k=0}^{K_F-1}\left[\sum_{i=0}^{3} h\left(kT_F + \varepsilon + \frac{\eta}{v\tan(\pi/30)} + iT_d; v\right) + \right.\right.$$

$$\sum_{i=0}^{3} h\left(kT_F + \varepsilon - \frac{\eta}{v\tan(\pi/30)} + iT_d + \frac{T_F}{4}; v\right) +$$

$$\sum_{\substack{i=0, \\ i\ even}}^{4} h\left(kT_F + \varepsilon + \frac{\eta}{v\tan(\pi/30)} + iT_d + \frac{T_F}{2}; v\right) +$$

$$\sum_{\substack{i=1, \\ i\ odd}}^{3} h\left(kT_F + \varepsilon + \frac{\eta}{v\tan(\pi/30)} + (i+\xi(i-2)\alpha_k)T_d + \frac{T_F}{2}; v\right) +$$

$$\sum_{\substack{i=0, \\ i\ even}}^{4} h\left(kT_F + \varepsilon - \frac{\eta}{v\tan(\pi/30)} + iT_d + \frac{3T_F}{4}; v\right) +$$

$$\left.\left.\sum_{\substack{i=1, \\ i\ odd}}^{3} h\left(kT_F + \varepsilon - \frac{\eta}{v\tan(\pi/30)} + (i+\xi(i-2)\alpha_k)T_d + \frac{3T_F}{4}; v\right)\right]\right\}. \qquad (11)$$

Assuming that the joint probability distribution of the y-position and the tape velocity, as well as the a priori distribution of the LPOS symbols, are known, the maximum-likelihood (ML) estimate of the timing phase is then given by $$\hat{\tau} = \arg\max_{\varepsilon} \int\int\left[\sum_{\alpha} L_{\tau,y,v,\alpha}(\varepsilon, \eta, v, \beta)P[b=\beta]\right]p_{y,v}(\eta, v)d\eta dv. \qquad (12)$$

The application of the classical ML estimation method to obtain an estimate of the timing phase, however, presents the following severe difficulties:

a) The ML estimation method in the above formulation is not well suited for direct implementation, or even for implementation in the form of a timing recovery feedback loop with an error term being computed every servo frame, as the computational complexity would be too large.

b) Finding the maximum of the likelihood function requires that the partial derivative with respect to $\tau$ of the convolution integral be computed first; this operation may be performed in the digital domain, but it usually leads to larger implementation complexity and non negligible noise enhancement.

c) The random variables, on which the likelihood function depends, may exhibit time-varying probability distributions; for example, variations of tape velocity, as experienced during ramp-up and ramp-down, may cause significant variations of the joint probability distribution of tape velocity and timing phase within a few servo frames.

The present invention further provides for the generation of the timing basis for synchronous servo channel operation, relying on a timing recovery loop where timing adjustments are determined by the observation of the zero crossings of the interpolated servo channel signal. Assuming that reliable estimates $\hat{y}$ and $\hat{v}$ of the y-position and the tape velocity are efficiently computed, as will be shown in the next Section, and observing that only four terms in the sum at the exponent of the likelihood function (11) depend on the LPOS symbol $a_k$, for each k, the estimate of the timing phase may be approximated as follows:

$$\hat{\tau} \approx \arg\max_{\varepsilon} \tilde{L}_{\tau,y,v}(\varepsilon, \hat{y}, \hat{v}), \qquad (13)$$

where:

$$\tilde{L}_{\tau,y,v}(\varepsilon, \hat{y}, \hat{v}) = \qquad (14)$$

$$\exp\left\{\frac{2}{N_0}\sum_{k=0}^{K_F-1}\left[\sum_{i=0}^{3} h\left(k\hat{T}_F + \varepsilon + \frac{\hat{y}}{\hat{v}\tan(\pi/30)} + i\hat{T}_d; v\right) + \right.\right.$$

$$\sum_{i=0}^{3} h\left(k\hat{T}_F + \varepsilon - \frac{\hat{y}}{\hat{v}\tan(\pi/30)} + i\hat{T}_d + \frac{\hat{T}_F}{4}; v\right) +$$

$$\sum_{\substack{i=0, \\ i\ even}}^{4} h\left(k\hat{T}_F + \varepsilon + \frac{\hat{y}}{\hat{v}\tan(\pi/30)} + i\hat{T}_d + \frac{\hat{T}_F}{2}; v\right) +$$

$$\left.\left.\sum_{\substack{i=0, \\ i\ even}}^{4} h\left(k\hat{T}_F + \varepsilon - \frac{\hat{y}}{\hat{v}\tan(\pi/30)} + i\hat{T}_d + \frac{3\hat{T}_F}{4}; v\right)\right]\right\}.$$

In the above formulation, the dependence of the likelihood function on the sequence of LPOS symbols, as well as the averaging over the y-position and the tape velocity, have been removed. The computation of the partial derivative with respect to the timing phase, however, is still needed to find the maximum of the likelihood function. The notation $\hat{y}$ and $\hat{v}$ is introduced to indicate the y-position and the tape velocity estimates instead of $y_{est}$ and $v_{est}$, defined in (3) and (4), because low-pass filtering is assumed for the generation of $\hat{y}$ and $\hat{v}$, whereas $y_{est}$ and $v_{est}$ refer to instantaneous estimates.

Figure 11A:
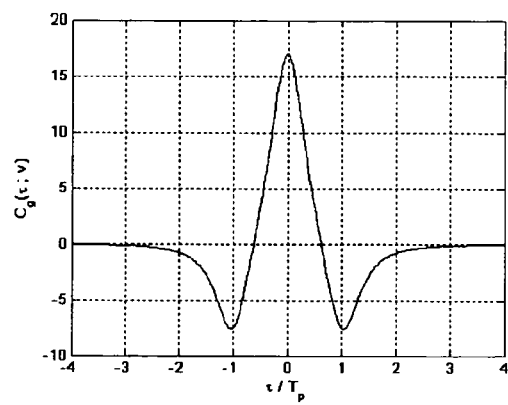
FIG. 11A is a plot of an auto correlation of the dibit pulse.
Figure 11B:
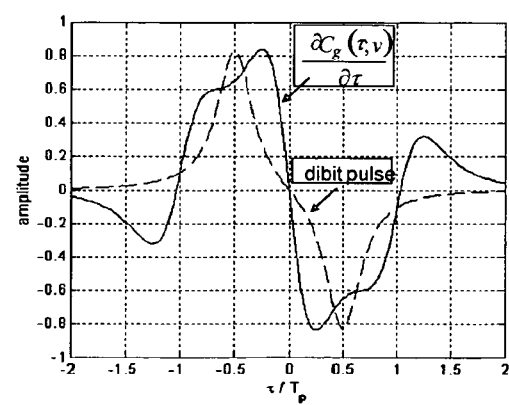
FIG. 11B is a plot of a partial derivative of the autocorrelation function.

Note that, for moderate to large values of the signal-to-noise ratio, each peak of $h(\tau;v)$ is approximately determined by the peak of the autocorrelation function of the dibit pulse $C_g(\tau-T_s;v)=g^*g_M(\tau-T_s;v)$, for a proper choice of the time shift $T_s$. Also note that, as $g(\tau;v)$ is a function with odd symmetry, the autocorrelation $C_g(\tau;v)$ is a function with even symmetry. Therefore for small deviations of the timing phase from the optimum value, the partial derivative of $h(\tau;v)$ with respect to the timing phase, and hence also the partial derivative of the likelihood function $\tilde{L}_{\tau,y,v}(\epsilon,\hat{y},\hat{v})$, exhibits odd symmetry. This means that the behavior of the partial derivative of $h(\tau;v)$ is similar to the behavior of the dibit pulse for small values of the argument, provided the dibit pulse is regarded as a function of the deviation of the timing phase from the optimum value, as illustrated in FIGS. 11A and 11B.

With the further observation that the peaks of $h(\tau;v)$ are obtained in correspondence of the zero crossings of the servo channel signal, which occur between the peaks of the dibit pulses of the servo bursts, it is possible to conclude that the timing information provided by the ML approach is approximately equal to the timing information that is obtained by directly sampling the servo channel signal in correspondence of the zero crossings. Therefore, assuming that $\hat{\tau}$ represents a reliable estimate of the timing phase, that is $\hat{\tau} \approx \tau$, the desired timing information can be expressed as $$\frac{\partial}{\partial \epsilon} \tilde{L}_{\tau,y,v}(\hat{\tau}+\epsilon,\hat{y},\hat{v})\big|_{\hat{\tau}\approx\tau,\epsilon\approx0,\hat{y}\approx y,\hat{v}\approx v} \approx \quad (15)$$

$$\Gamma \sum_{k=0}^{K_F-1} \left[ \sum_{i=0}^{3} g\left(\epsilon+(\hat{\tau}-\tau)+\frac{\hat{y}/\hat{v}-y/v}{v\tan(\pi/30)}+i(T_d-\hat{T}_d)+k(T_F-\hat{T}_F); \right.\right.$$

$$\left. v\right) + \sum_{i=0}^{3} g\left(\epsilon+(\hat{\tau}-\tau)-\frac{\hat{y}/\hat{v}-y/v}{\tan(\pi/30)}+i(T_d-\hat{T}_d)+\right.$$

$$\left.(k+1/4)(T_F-\hat{T}_F); v\right) + \sum_{\substack{i=0,\\i\text{ even}}}^{4} g\left(\epsilon+(\hat{\tau}-\tau)+\right.$$

$$\left.\frac{\hat{y}/\hat{v}-y/v}{\tan(\pi/30)}+i(T_d-\hat{T}_d)+(k+1/2)(T_F-\hat{T}_F); v\right)+$$

$$\sum_{\substack{i=0,\\i\text{ even}}}^{4} g\left(\epsilon+(\hat{\tau}-\tau)-\frac{\hat{y}/\hat{v}-y/v}{\tan(\pi/30)}+i(T_d-\hat{T}_d)+\right.$$

$$\left.(k+3/4)(T_F-\hat{T}_F); v\right) + \tilde{w}_k \Bigg],$$

where $\Gamma$ denotes a gain factor and $\tilde{w}_k$ an additive white Gaussian noise (AWGN) sample. Note that the noise enhancement caused by the computation of the partial derivative is completely avoided. The antialiasing filtering operation that is performed prior to analog-to-digital conversion is in this case approximately equivalent to optimum filtering for the generation of a sufficient statistics for the signal r(t).

Figure 12:
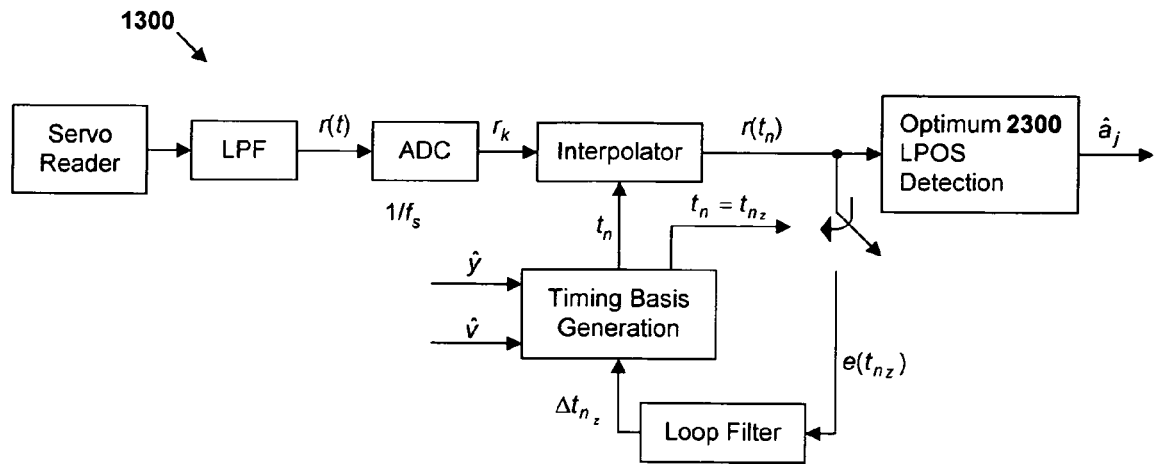
FIG. 12 illustrates a block diagram of the operation of the timing basis generation system.

A timing basis generation system 1200, which relies on the zero crossings of the interpolated servo channel signal to determine a timing error in an error-feedback configuration, can thus be devised as depicted in FIG. 12. Note that the averaging operation corresponding to the summations in the expression of the timing error (15) is performed by the loop filter 1202, which is assumed to be of the proportional-plus-integrator type. Therefore, assuming reliable y-position and tape velocity estimates as well as negligible interpolation error, the timing error estimate $e(t_{n_z})$ that is input to the loop filter is given by $$e(t_{n_z})=s(t_{n_z},\tau,y,v,a)+w(t_{n_z})\approx g(\epsilon_{n_z};v)+w_{n_z}, \quad (16)$$

where $t_{n_z}$ denotes the time instant provided by the timing basis generation system for signal interpolation in the proximity of a zero crossing of the servo channel signal that is considered for timing recovery, $\epsilon_{n_z}$ denotes the deviation of $t_{n_z}$ from the time of the zero crossing, and $w_{n_z}$ is an AWGN sample.

Figure 13:
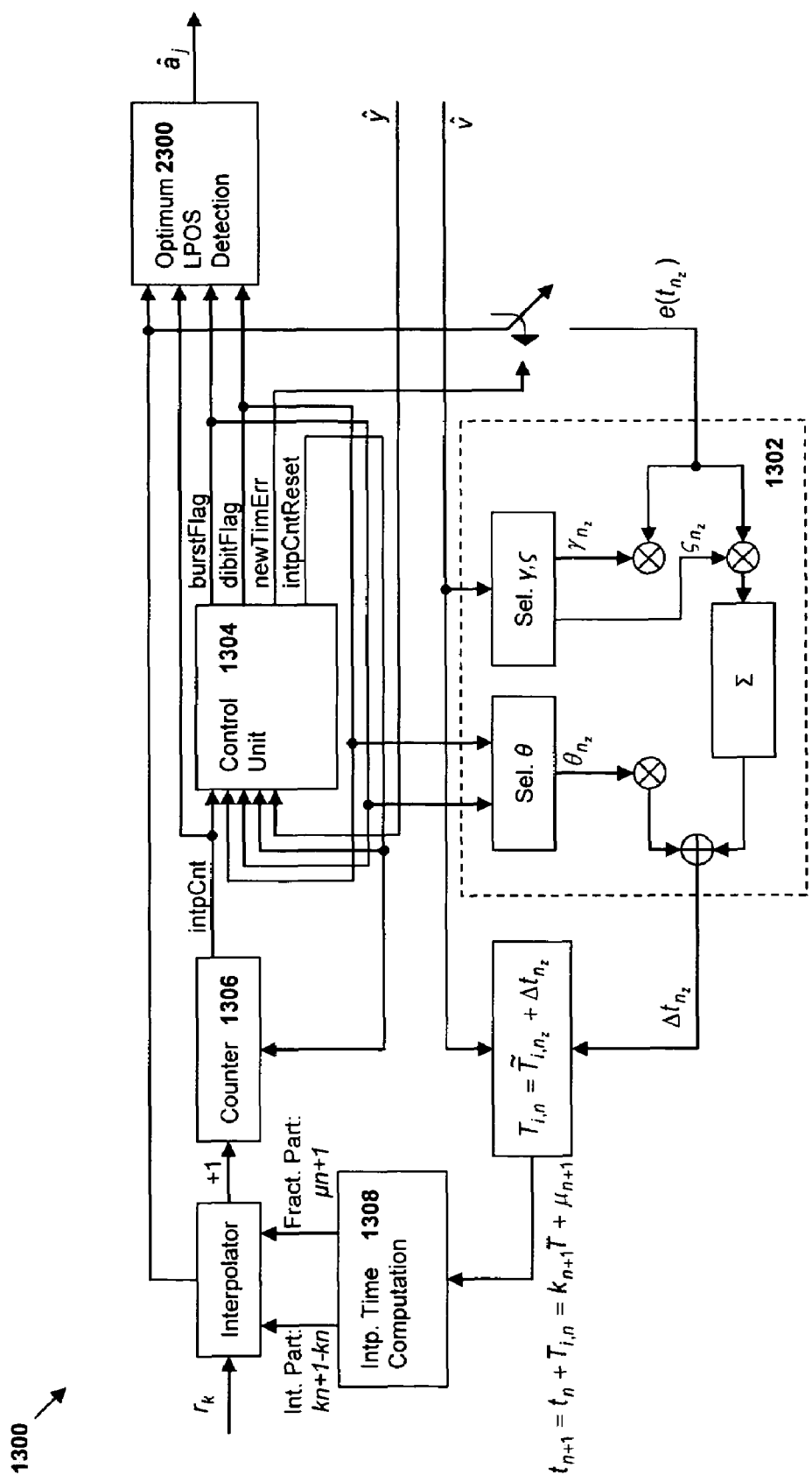
FIG. 13 illustrates a more detailed block diagram of the timing basis generation system.

The block diagram of the timing basis generation system 1300 is shown in FIG. 13. The sequence $\{t_n\}$ indicates the time instants at which signal samples $\{r(t_n)\}$ are to be determined so that they are obtained at the desired fixed rate of $1/x_i$ samples per micrometer, independent of tape velocity. Clearly, the nominal step interpolation interval $T_i$ and the ADC sampling interval T are in general incommensurate. Linear interpolation is therefore employed to obtain signal samples at the interpolation time instants $\{t_n\}$, which are recursively obtained as $$t_{n+1}=t_n+T_{i,n}, \quad (17)$$

where $T_{i,n}$ denotes the estimate of the nominal step interpolation interval, as defined by (2). The step interpolation interval estimate is given by $$T_{i,n}=\tilde{T}_{i,n_z}+\Delta t_{n_z}, \quad (18)$$

where $\tilde{T}_{i,n_z}=x_i/\hat{v}$ is the step interpolation interval estimate directly derived from the tape velocity estimate, $\Delta t_{i,n_z}$ is the correction term obtained at the loop filter output, and $n_z$ is the largest time index smaller than or equal to n, at which a timing error estimate has been input to the loop filter. In the interpolation-time computation unit, the n-th interpolation instant is expressed as $$t_n = T\frac{t_n}{T} = T\left(\left\lfloor\frac{t_n}{T}\right\rfloor+\mu_n\right) = T(k_n+\mu_n), \quad (19)$$

where $k_n$ and $\mu_n$ denote the integer part and the fractional part of the n-th interpolation instant, respectively, in terms of multiples of the sampling interval T. Linear interpolation thus yields the interpolated signal sample given by $$r(t_n) = r_{k_n} + \mu_n(r_{k_n+1} - r_{k_n}). \quad (20)$$

The goal of the timing basis generation system 1300 is to provide interpolated signal samples that reproduce the signal generated by the servo reader in correspondence to points on tape that are on a line parallel to the servo band centerline and equally spaced by the step interpolation distance $x_i$. In general, however, the values of y-position and tape velocity are such that the interpolated signal samples do not exactly correspond to zeros of the servo channel signal. In other words, the timing error estimate $e(t_{n_z})$ is given by an interpolated signal sample that is computed at a position, which is at a multiple of the step interpolation distance $x_i$ and closest to a zero crossing, as estimated by the timing basis generation system. Therefore the step interpolation distance $x_i$ determines a lower bound on the standard deviation of the timing error estimate. Assuming that the zero crossing position is a random variable uniformly distributed within the step interpolation interval, the lower bound on the standard deviation of the timing error estimate is equal to $x_i/(\sqrt{12}v)$. For example, if $x_i = 0.05$ μm the lower bound on the standard deviation of the zero-crossing position error estimate is 14.4 nm. Note that in principle this lower bound can be made arbitrarily small by decreasing the size of the step interpolation distance $x_i$. In practice it is sufficient that the term $x_i/(\sqrt{12}v)$ is small compared to the contribution of AWGN to the standard deviation of the zero-crossing position error estimate.

As mentioned earlier, the zero crossings of the servo channel signal are not equally spaced. In particular, the time interval between zero crossings that contribute timing information depends on the y-position of the servo reader and on the tape velocity. Also recall that the zero crossings of the dibits in the A and B bursts that are used for the encoding of LPOS bits are not considered for the extraction of timing information. As illustrated in FIG. 13, the selection of the interpolated signal samples for the extraction of timing information is accomplished by a finite-state machine named "Control unit" 1304 in conjunction with an interpolation "Counter" 1306. Each time a new interpolated signal sample is computed, the "Counter" 1306 increments by one the variable IntpCnt that is input to the "Control unit" 1304. Assuming the estimate of the step interpolation interval $T_i$ that is employed by an "Interpolation time computation" unit 410 is reliable, and the information about the beginning of a servo frame, i.e. the time of the first zero crossing of the first dibit of the C burst in a servo frame, is available, knowledge of a reliable estimate of the y-position is sufficient for the "Control unit" 1304 to determine which interpolated signal samples must be selected for the extraction of timing information. The "Control unit" 1304 outputs the following variables:

a) burstFlag, variable identifying the current servo burst according to the rule 0→C burst, 1→D burst, 2→A burst, 3→B burst;
b) dibitFlag, variable identifying the current dibit within a servo burst;
c) newTimErr, variable asserted to input a new timing error estimate to the loop filter.
d) IntpCntReset, variable asserted to reset the interpolation "Counter" 1306.

At the end of a servo frame, i.e. at the zero crossing of the last dibit of a B burst, the variable IntpCntReset is asserted to reset the "Counter" 1306, the variable burstFlag is set to 0 to indicate the occurrence of a C burst, and the variable dibitFlag is also set to 0 to indicate the occurrence of the first dibit of the C burst. The estimate of the number of interpolation steps that separate the zero crossing of the last dibit of the B burst from the first dibit of the C burst is given by the variable $$IntpCntNum = \left\lfloor \frac{D_{BC,0} + 2\tan(\pi/30)\hat{y}}{x_i} \right\rfloor, \quad (21)$$

where $D_{BC,0}$ denotes the distance between the last dibit of the B burst and the first dibit of the C burst for y=0, which is equal to 30 μm and 35 μm for tape motion in the forward and in the backward direction, respectively. The variable newTimErr is asserted when the "Counter" 1306 indicates that IntpCntNum interpolation steps have been completed, the corresponding interpolated signal sample is input as a new timing error estimate to the timing recovery loop filter 1302, and the variable dibitFlag is set to 1 to indicate the upcoming occurrence of the second dibit of the C burst. Then the operation of the "Control unit" 1304 proceeds by computing the number of interpolation steps that separate the current zero crossing from the next zero crossing. Every time a new zero crossing is reached, the variable newTimErr is asserted and the variable dibitFlag is incremented by one. If the zero crossing is the last zero crossing of a servo burst, then the variable burstFlag is incremented by one and variable dibitFlag is set to 0. Note that the variable IntpCntNum indicating the number of estimated interpolation steps between zero crossings is given by $\lfloor L_d/x_i \rfloor$ if the next zero crossing belongs to the same servo burst, and by an expression similar to (21) if the next zero crossing belongs to a different servo burst, where the distance between the last dibit of the current burst and the first dibit of the next burst for y=0 is employed instead of $D_{BC,0}$. In the special case of the zero crossings of the second and fourth dibits of the A and B bursts that are used for the encoding of LPOS bits, the number of interpolation steps between the shifted dibits and the adjacent dibits given by IntpCntNum is still taken equal to $\lfloor L_d/x_i \rfloor$. When the interpolated signal sample that would correspond to a zero crossings of the second or the fourth dibit of the A and B bursts is computed, however, dibitFlag is incremented by one without asserting newTimErr. Upon achieving the zero crossing of the last dibit of a B burst, the "Counter" 1306 is again reset and the processing of a new servo frame starts.

Note that, in a practical implementation of the timing basis generation system 1300 for a synchronous servo channel, it is not necessary to explicitly compute interpolated signal samples at each interpolation step. Actual computation of interpolated signal samples may be effected only at a few time instants, which are determined by the "Control unit" 1304, as required for the generation of the timing adjustments and for matched filtering of pulse-position modulated LPOS signals, which are found in the A and B bursts.

Figure 14:
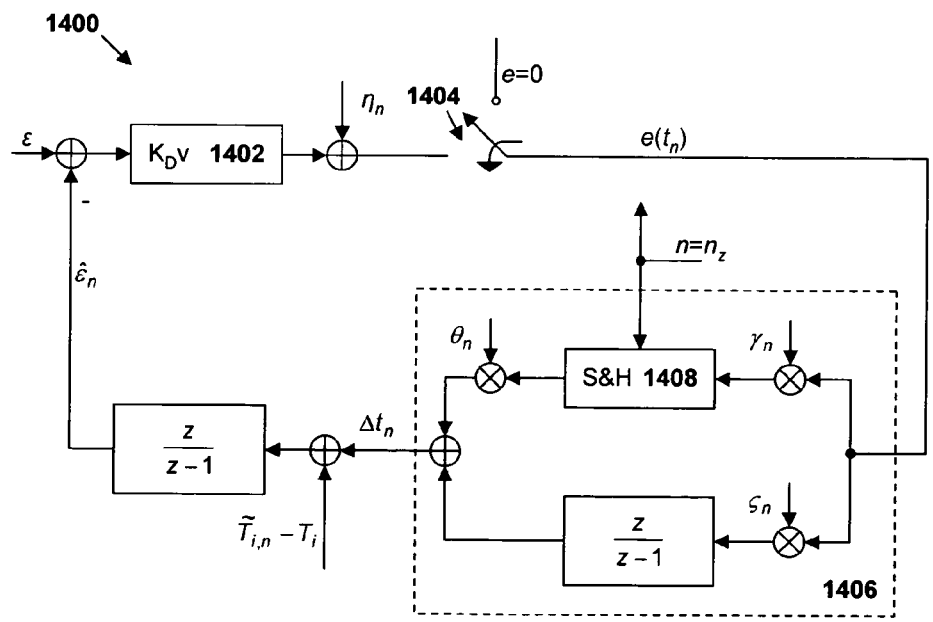
FIG. 14 illustrates linear equivalent model of the timing basis generation system.

Assuming small values of the timing error during normal servo channel operation, the linear equivalent model 1400 of the timing basis generation system 1300 depicted in FIG. 14 is obtained. Note that the model of the timing basis generation system considered here differs significantly from the models of discrete-time error-tracking synchronizers that are usually found in communication receivers or hard-disk drives, where timing error estimates are computed at equally spaced time intervals, and the range of frequency offset over which the synchronizer must operate is of the order of a few percent of the nominal frequency.

With reference to the diagram of FIG. 14, the gain of the timing error detector 1402 is given by the absolute value of the derivative of the dibit pulse at the zero crossing. From (6) and (7), it follows that the gain is proportional to the tape velocity and is thus expressed as $K_D v$. The noise sample $\eta_n$ includes the contributions of AWGN and quantization noise introduced by the nonzero length of the interpolation steps, as discussed above. The variable spacing between consecutive timing error estimates is modeled by including a switch 1404 that provides at the input of the loop filter 1406 the interpolated signal at the estimated zero crossing time instants, which are characterized by the indices $n=n_z$ (16), and a zero error signal at the other time instants. Observing (17) and (18), it turns out that the estimate of the nominal step interpolation interval $T_{i,n_z}$ that is determined at a zero crossing time instant is used by the timing basis generation system until a new timing error estimate is input to the loop filter and a new timing correction term $\Delta t_{n_z}$ is computed. This behavior is modeled by including a sample-and-hold element 1408 in the branch of the loop filter that yields the proportional term to the timing error estimate. Note that the variable duration of the hold intervals has the equivalent effect of a variable gain multiplying the timing error estimates. To compensate for this effect it is necessary to introduce a term, which is denoted by $\theta_n$ in the diagram of FIG. 14, to "equalize" the gain that is applied to each timing error estimate. As the minimum distance between zero crossings is $L_d=5$ µm, and the "Control unit" 1304 has the knowledge of the distance that separates the last visited zero crossing from the next, the value of $\theta_n$, which is independent of the tape velocity, is given by $$\theta_n = \frac{L_d}{D_{n_z}}, \quad (22)$$

where $D_{n_z}$ denotes the distance, in micrometers, of the zero crossing at time $t_{n_z}$ from the next upcoming zero crossing, and $n_z$ is the largest time index smaller than or equal to n, at which a timing error estimate has been input to the loop filter, see also (18).

Figure 15:
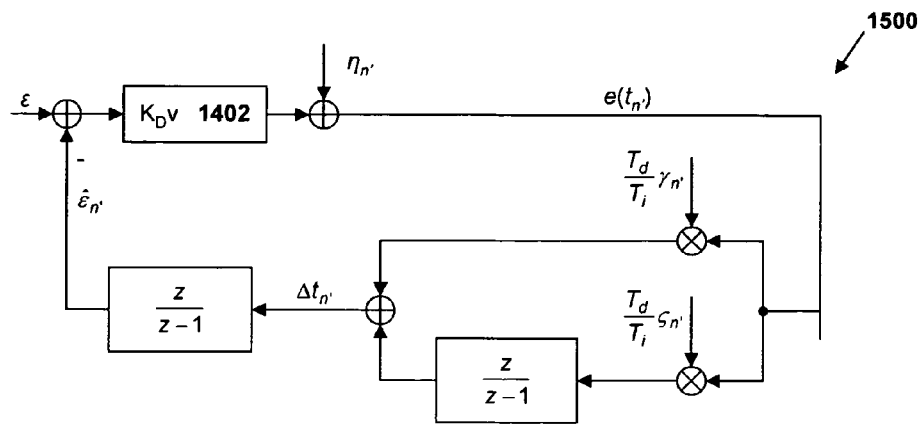
FIG. 15 illustrates a simplified model of the timing basis generation system.

As mentioned previously, the timing basis generation system 1300 for the synchronous servo channel 400 must operate over a wide range of tape velocities, which translates into a wide range of corresponding minimum servo channel signal bandwidths. Clearly this fact has a non negligible impact on system parameters, which must be chosen such that the dynamic behavior of the timing basis generation system remains essentially independent of tape velocity. To assess system performance for varying tape velocity the simplified model 1500 illustrated in FIG. 15 is considered. The variable spacing of the timing error estimates is assumed to be perfectly compensated by the presence of the variable gain $\theta_n$, as discussed above, and the tape velocity estimate is assumed to be equal to the actual velocity, i.e. $\hat{v}=v$, so that the offset term $\hat{T}_{i,n}-T_i$ vanishes. Thus the loop of FIG. 15 is equivalent to a tracking error synchronizer having at the input a signal that is cyclostationary with period $T_d=L_d/v$ µs. Using this simplified model 1500, the loop bandwidth of the timing basis generation system 1300, which depends on the tape velocity, is given by $$B(v) = \int_0^{1/(2T_d)} |H(e^{j2\pi f T_d}; v)|^2 \, df, \quad (23)$$

where the closed-loop frequency response $H(z;v)$ is expressed as $$H(z;v) = \frac{K_D v z \frac{T_d}{T_i}\left(\gamma_n + \zeta_n \frac{z}{z+1}\right)}{z - 1 + K_D v z \frac{T_d}{T_i}\left(\gamma_n + \zeta_n \frac{z}{z+1}\right)}. \quad (24)$$

By choosing the loop parameters $\gamma_n = \gamma/\hat{v}$ and $\zeta_n = \zeta/\hat{v}$, and substituting the expressions of $H(z;v)$ and $T_d$ into (23), it turns out that the product $B(v)T_d$, which determines the loop behavior, is independent of the tape velocity. For example, by choosing $K_D=1$, $\gamma=1.1\times10^{-2}$, and $\zeta=9.4\times10^{-6}$, the product $B(v)T_d=0.18$ is obtained.

A further requirement of the timing basis generation system 1300 is that reliable servo channel operation be achieved during tape acceleration and deceleration. Note that this requirement translates into asking that reliable channel operation be achieved while the frequency $1/T_d$ varies linearly with time. It is well known that a second-order timing recovery loop, similar to the simplified model 1500 of FIG. 15, exhibits a nonzero timing error in the presence of a linearly varying input frequency. The choice of periodically updating the step interpolation interval estimate $\hat{T}_{i,n_z}$, which is adjusted by the correction term at the filter output to determine the interpolation instants, by using the tape velocity estimate $\hat{v}$, see (18), obviates this problem without increasing the loop bandwidth or the order of the loop filter. Therefore reliable system operation is achieved even during ramp up and ramp down. As a consequence, if the tape velocity is constant, the term accumulated in the integrator of the loop filter becomes vanishingly small. Note that in this case the multiplication by the variable gain $\theta_n$ may be performed after the loop filter without significantly affecting the loop behavior.

Figure 16A:
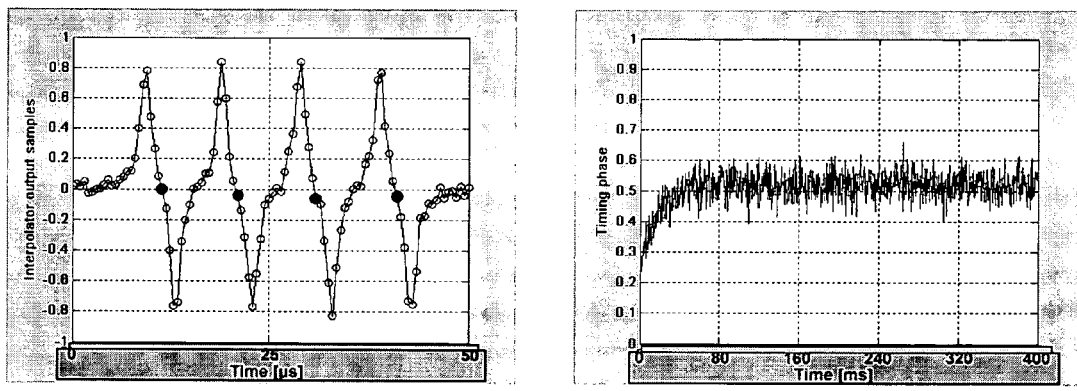
FIGS. 16A and 16B illustrate plots of interpolated signal samples and timing phase convergence for v=0.5 m/s and for v=12.5 m/s, respectively.
Figure 16B:
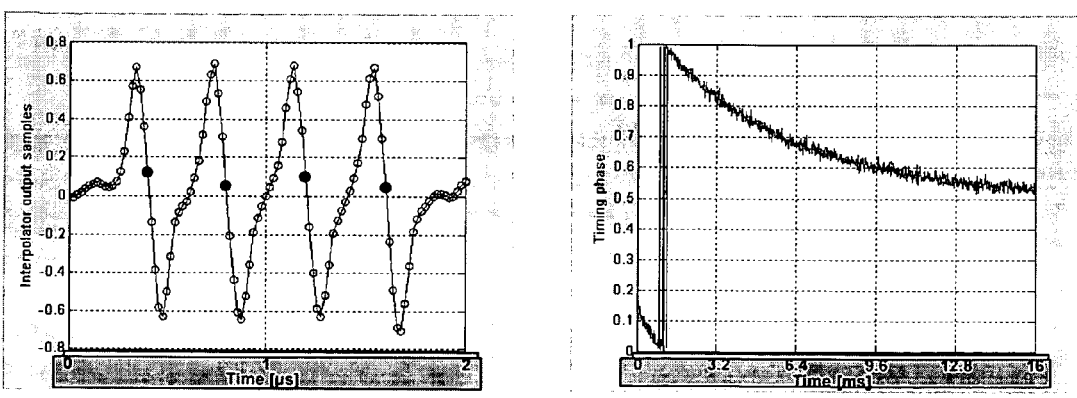

The performance of the timing basis generation system 1300 has been investigated by simulations. FIGS. 16A and 16B show the interpolated signal samples of a C burst and the convergence of the timing phase for constant values of the tape velocity equal to $v=0.5$ m/s (FIG. 16A) and $v=12.5$ m/s (FIG. 16B). The samples that have been input to the loop filter as timing error estimates in the neighborhood of the zero crossing instants are indicated by red markers. The results have been obtained for a Lorentzian channel with PW50/2.1 µm=0.4 for the generation of the servo bursts and AWGN yielding SNR=25 dB, sampling frequency of the ADC $f_s=15$ MHz, nominal step interpolation distance $x_i=0.25$ µm, initial error on the velocity estimate equal to 1%, and loop filter parameters equal to $\gamma/\hat{v}=1\times10^{-1}$ and $\zeta/\hat{v}=2\times10^{-4}$ for $v=0.5$ m/s, and $\gamma/\hat{v}=1\times10^{-3}$ and $\zeta/\hat{v}=2\times10^{-6}$ for $v=12.5$ m/s.

Generation of Estimates Based on the Zero Crossings of the Servo Channel Output Signal In the previous Section, it was recognized that the timing basis generation system 1300 of the synchronous servo channel 400 needs reliable y-position and tape velocity estimates, denoted by $y_{est}$ and $v_{est}$, respectively, to determine the estimates of the step interpolation interval and of the time instants of the zero crossings of the interpolated signal, as well as the various loop parameter values. Therefore the problem arises of the generation of $y_{est}$ and $v_{est}$, which should be performed by using the signal samples at the output of the servo channel ADC 406, so that coupling between the generation of $y_{est}$ and $v_{est}$ and the generation of the timing basis is avoided. A related problem is the monitoring of the synchronous servo channel operation. A monitoring system must be devised, which is able to early detect occasional detuning of the timing basis generation system, which for example may be determined by temporary impairments in the servo channel output signal, and restart the acquisition procedure. Also in this case a solution must be obtained by observing directly the signal samples at the output of the servo channel ADC.

Recall that the tape velocity and y-position estimates at the end of the acquisition process are given by (3) and (4), respectively, where the peak arrival times of C, D, and A bursts at the output of the servo channel ADC are considered for the computation of the estimates, see also FIG. 6. The generation of the y-position and tape velocity estimates based on peak detection, however, presents the following drawbacks:

a) The arrival time of the peak of a dibit is determined by an operation that approximates the computation of the derivative of the signal and therefore introduces noise enhancement.

b) If one or more peaks of the dibits in the C, D, and A bursts are not detected, no reliable generation of the y-position and tape velocity estimates is possible. To cope with missed peak detection events, insertion of dummy peak arrival times to obtain $y_{est}$ and $v_{est}$ is not a desirable approach.

c) Detecting the loss of acquisition parameters, and properly restarting and validating the generation of the y-position and tape velocity estimates, may take a long time, of the order of several servo frames.

The present invention further provides for the generation of the y-position and tape velocity estimates and concurrent monitoring of the synchronous servo channel 400 operation. The method relies on determining the zero crossings of the signal at the output of the servo channel ADC to generate the estimates $y_{est}$ and $v_{est}$, and on observing the occurrence of the peaks of the same signal within time intervals, which are determined by a finite-state machine, to monitor the synchronous servo channel operation. The finite-state machine "Control unit" 1304 of the timing basis generation system is employed to provide the necessary observation windows.

During the initial parameter acquisition process, the tape velocity and y-position estimates are determined by using measurements of the time intervals between corresponding dibits in the C, D, and A bursts. To compute the estimates given by (3) and (4), the peak arrival times of the dibits are considered. During the generation of the timing basis, however, reliable information about the timing phase of the servo channel output signal is obtained by observing the time instants of the zero crossings of the dibits of the servo bursts, whereas timing information that is obtained by determining the time instants of the peaks of the servo signal after matched filtering is affected by noise enhancement. This is due to the fact that the time instant of a peak is determined by an operation that approximates the computation of the signal derivative. Therefore by introducing in (3) and (4) measurements of time intervals that are obtained by the time instants of the zero crossings of the servo channel output signal more reliable estimates are obtained than using measurements of peak arrival times that are affected by noise enhancement.

In this manner the problem of determining the estimates $y_{est}$ and $v_{est}$, in the event of missed peak detection is avoided, as the timing basis generation system 1300 provides the information about the observation intervals where with high probability the zero crossings of the servo channel output signal are expected to occur. In the occasional event that no zero crossing occurs within an observation interval, due for example to impairments in the servo channel output signal, the estimated time instant of the zero crossing that is provided by the timing basis generation system is employed. However, if the impairments persist for a long period spanning several servo frames, detuning of the timing basis generation system may occur. To detect such an event, the occurrence of the peaks of the dibits of the servo bursts within the observation windows that are determined by the timing basis generation system is still monitored. If the number of detected peaks per servo frame falls below a fixed threshold and remains below that threshold over a predetermined time interval, loss of lock is declared and the initial acquisition process is restarted.

As illustrated in FIG. 4, the generation of the y-position and tape velocity estimates and monitoring of the synchronous servo channel operation is performed by two functions. The "Asynchronous monitoring function" 408 determines the zero crossing time instants and detects the occurrence of the dibit peaks based on the observation intervals that are provided by the "Control unit" 1304, which has complete timing information concerning the dibits in the bursts of a servo frame, as previously discussed. The "Synchronous monitoring function" 404 then computes the y-position and tape velocity estimates and monitors the operation of the timing basis generation function based on the information that is obtained from the "Asynchronous monitoring function" 408.

Figure 17:
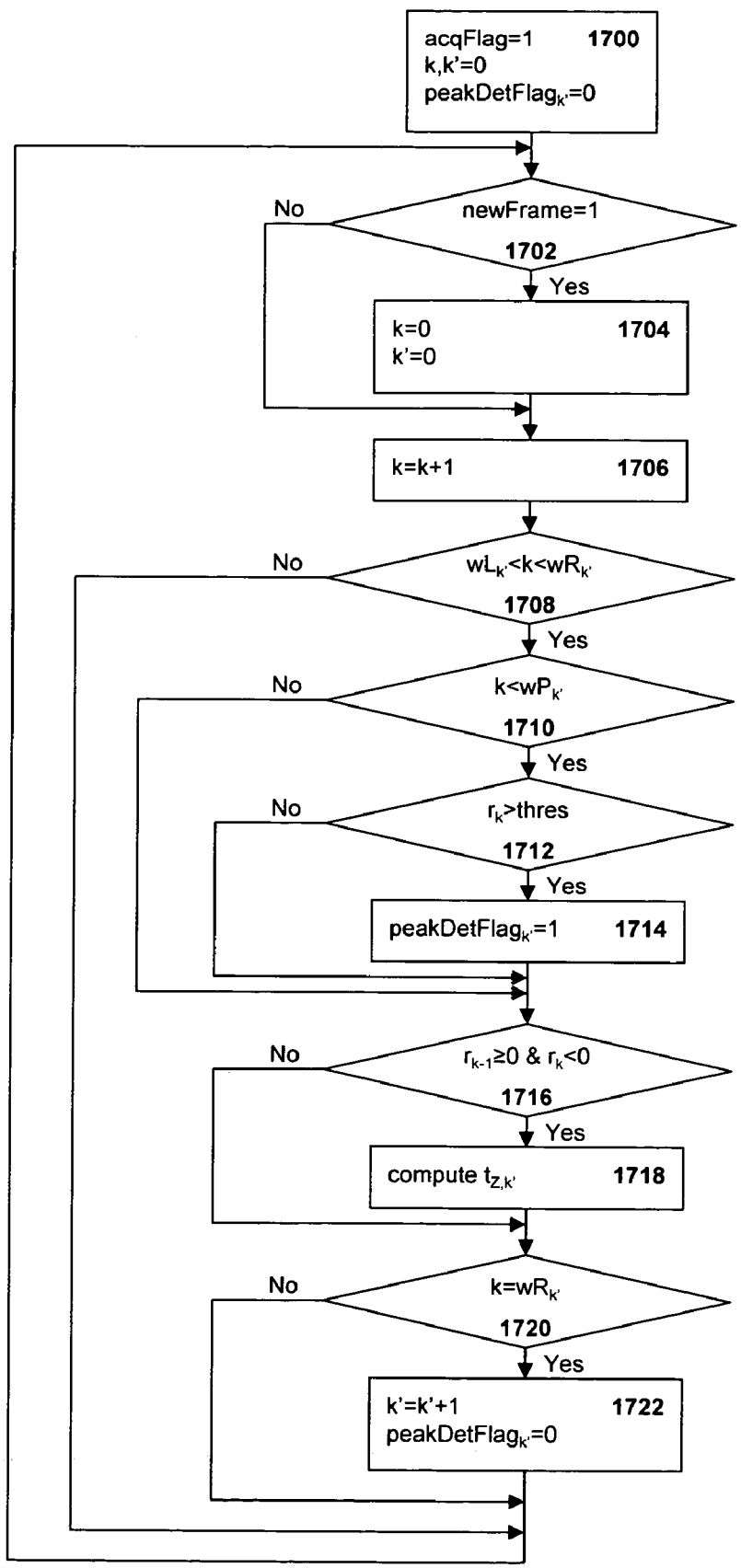
FIG. 17 is a flow chart describing the operation of the asynchronous monitoring function.

A flow chart describing the operation of the asynchronous monitoring function 408 is shown in FIG. 17. At the end of the acquisition process, the following variables are initialized (step 1700):

a) acqFlag=1, acquisition flag indicating that the synchronous servo channel is in tracking mode;

b) k=0, counter incremented by one at each sampling instant and reset at the beginning of each servo frame;

c) k'=0, index incremented by one at each zero crossing instant and reset at the beginning of each servo frame;

d) peakDetFlag$_{k'}$=0, peak detection flag that is reset to 0 at the beginning of each k'-th time interval delimited by zero crossing instants within a servo frame and is set to 1 if the positive peak of a dibit is detected in the k'-th time interval.

At each sampling instant, the "Asynchronous monitoring function" 408 first checks whether the occurrence of a new frame is being signaled by the "Control unit" 1304 (step 1702). Recall that at the end of a servo frame, i.e. at the zero crossing of the last dibit of a B burst, the variable IntpCntReset is asserted to reset the "Counter" 1306, the variable burstFlag is set to 0 to indicate the occurrence of a C burst, and the variable dibitFlag is also set to 0 to indicate the occurrence of the first dibit of the C burst. Therefore the variable newFrame is set to 1 whenever the variable IntpCntReset is asserted. In that case, the counter k and the index k' are reset (step 1704). After checking for the occurrence of a new frame, the counter k is incremented by one (step 1706.

Figure 18:
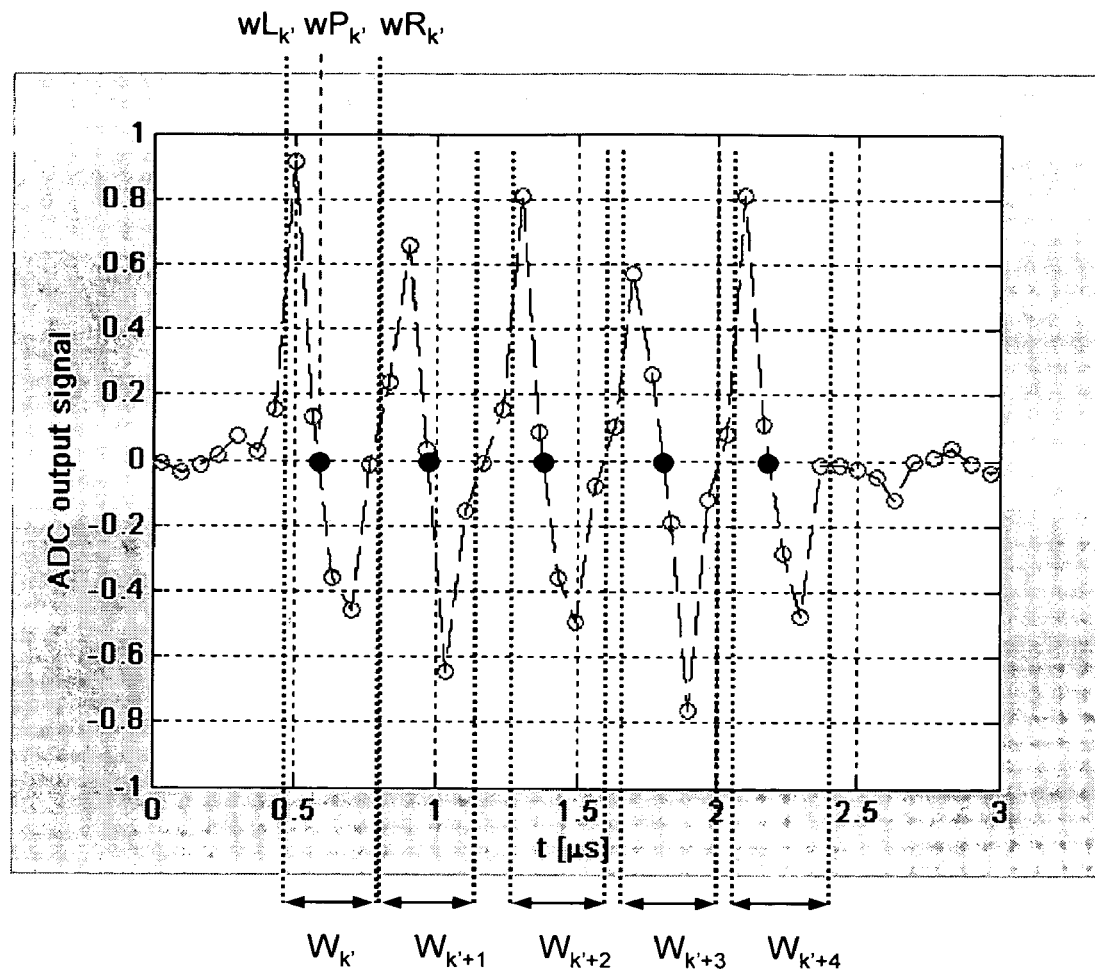
FIG. 18 is a timing diagram illustrating the generation of the observation windows.

The value assumed by the counter is then compared with the limits of the k'-th observation interval (wL$_{k'}$, wR$_{k'}$) (step 1708), which are provided by the "Control unit" 1304. Assuming that the polarity of the servo channel signal is such that the positive peak of a dibit is detected first, the positive peak as well as the zero crossing associated with the k'-th dibit of a servo frame are expected to be detected within the k'-th observation interval. The "Control unit" 1304 also provides a third variable, denoted by $wP_{k'}$, such that $wL_{k'} < wP_{k'} < wR_{k'}$. Then ($wL_{k'}$, $wP_{k'}$) defines the subinterval within the k'-th observation interval where the dibit peak is expected to be detected, as illustrated in FIG. 18 for sampling frequency $f_s$=15 MHz and constant tape velocity v=12.5 m/s. If $wL_{k'} < k < wP_{k'}$ (step 1710) and the channel output sample $r_k$ exceeds a given threshold value (step 1712), denoted by thres, then the variable peakDetFlag$_{k'}$ is set to 1 (step 1714) to indicate that a dibit peak has been detected in the k'-th time interval. If $wL_{k'} < k < wR_{k'}$ and the two most recent channel output samples satisfy the condition $r_{k-1} \geq 0$ and $r_k < 0$ (step 1716), then a zero crossing is detected and the zero crossing instant in the k'-th time interval is computed as $$t_{Z,k'} = \left[(k-1) + \frac{r_{k-1}}{r_{k-1} - r_k}\right]T. \quad \text{(step 1718)} \quad (25)$$

Each zero crossing instant, which is indicated by a filled circle marker in the illustration of FIG. 18, is recorded as an integer plus fractional part, where the integer part is given by the value k−1 and the fractional part is determined by using a simple look-up table.

When $k = wR_{k'}$ (step 1720), the observation interval expires, the index k' is incremented by one, and the variable peakDetFlag$_{k'}$ is reset to 0 (step 1722). As mentioned above, if by the time the observation interval expires no zero crossing has been detected, the variable $t_{Z,k'}$ takes the value of the estimated time instant of the zero crossing that is provided by the timing basis generation system 1300.

Figure 19:
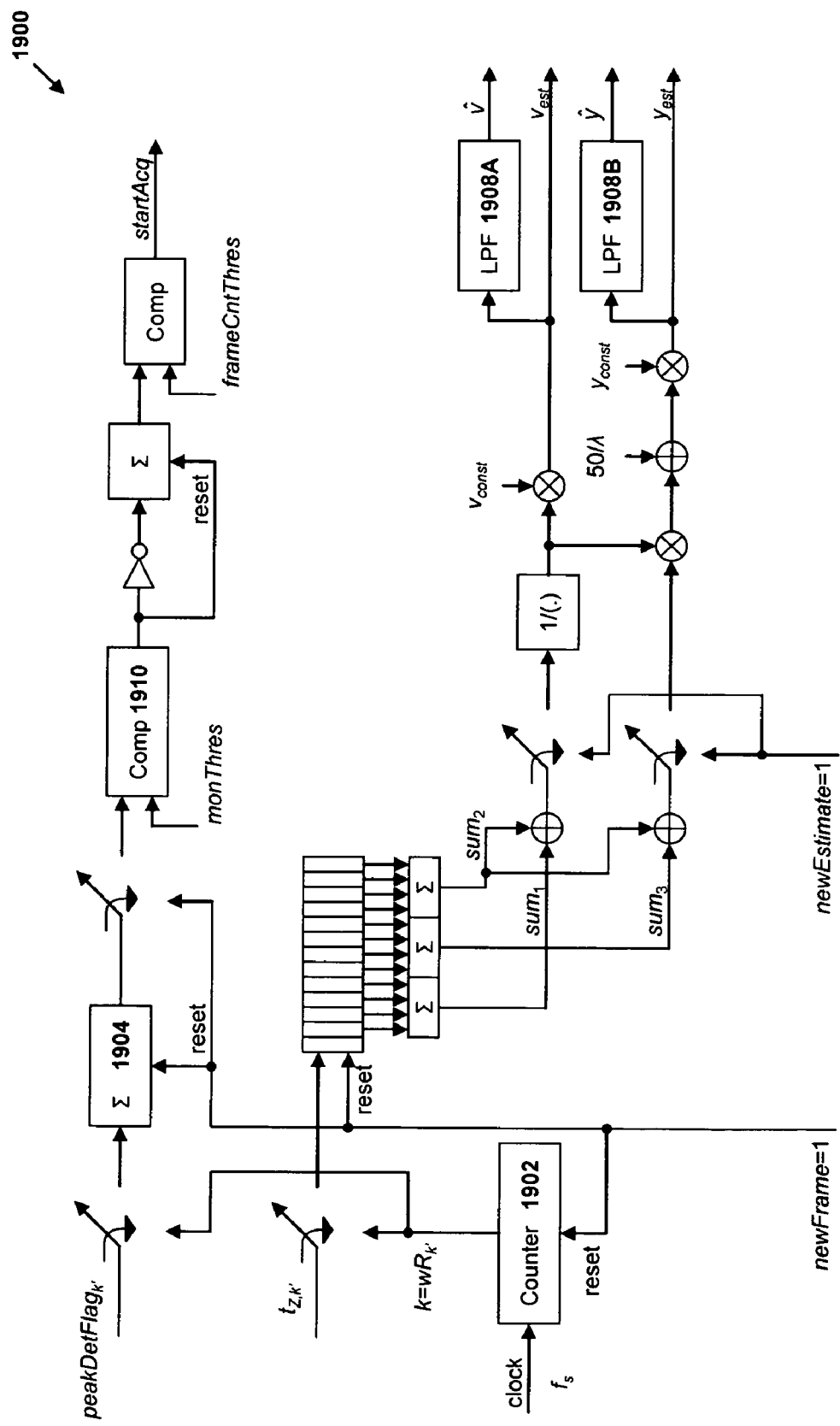
FIG. 19 illustrates a block diagram of the synchronous monitoring function.

A block diagram of the "Synchronous monitoring function" 1900 is depicted in FIG. 19. When a counter 1902 achieves the upper limit of the observation window, i.e. $k = wR_{k'}$, the values of the variables peakDetFlag$_{k'}$ and $t_{Z,k'}$ are input to an accumulator 1904 and to a delay line 1906, respectively. The counter 1902, the accumulator 1904, and the delay line 1906 are reset whenever the variable newFrame is set to 1, i.e. at the beginning of each servo frame. At the end of A bursts, the time intervals between corresponding dibits in the C, D, and A bursts can be evaluated. Therefore the variable newEstimate is set to 1 at the end of the observation window associated with the last dibit of an A burst, and new values of the y-position and tape velocity estimates are computed. With reference to FIG. 6, the measurements of the time intervals between corresponding dibits in the C, D, and A bursts are given by $$B1+B2+B3+B4 = \text{sum}_1 - \text{sum}_2 = t_{Z,0} + t_{Z,1} + t_{Z,2} + t_{Z,3} - (t_{Z,8} + t_{Z,9} + t_{Z,10} + t_{Z,11}), \quad (26)$$

and $$A1+A2+A3+A4 = \text{sum}_3 - \text{sum}_2 = t_{Z,4} + t_{Z,5} + t_{Z,6} + t_{Z,7} - (t_{Z,8} + t_{Z,9} + t_{Z,10} + t_{Z,11}). \quad (27)$$

The "Synchronous monitoring function" 404 then implements the computation of the instantaneous values of the estimates $y_{est}$ and $v_{est}$, according to (3) and (4), respectively, where $y_{const} = \lambda/[2 \tan(\pi/30)]$ and $v_{const} = 4\lambda f_s$. Recall that $\lambda$=100 μm for forward tape motion and $\lambda$=95 μm for reverse tape motion. The average values $\hat{y}$ and $\hat{v}$ of the y-position and tape velocity estimates are evaluated by the first-order low-pass filters 1908A, 1908B in the circuit 1900 illustrated in FIG. 19. The time constants of the low-pass filters 1908A, 1908B are chosen as a compromise between the requirements of reducing the noise affecting the instantaneous values of the estimates and keeping the latency in the computation of the average values of the estimates, which are employed by the timing basis generation system, small compared with the inverse of the maximum rate of change of the y-position and tape velocity in a tape drive.

At the end of each frame, the content of the accumulator 1904 for the variable peakDetFlag$_{k'}$ indicates the number of positive peaks of the dibits in the servo bursts that have been detected. This number is then compared 1910 with a predetermined threshold value denoted by monThres, and the accumulator 1904 is reset. If for a consecutive number of servo frames equal to a predetermined value, denoted by frameCntThres, the number of detected peaks in a frame is less than monThres, then loss-of-lock is declared and the acquisition procedure is restarted.

The performance of the system for the generation of y-position and tape velocity estimates has been investigated by simulations. FIGS. 20A, 20B and 21A, 21B show the mean and standard deviation of the y-position estimate and the standard deviation of the tape velocity estimate, respectively, for constant values of the y-position equal to y=0 m and of the tape velocity equal to v=6 m/s (FIGS. 20A, 21A) and v=12 m/s (FIGS. 20B, 21B). The mean value of the tape velocity estimate is not shown because the deviation of the mean from the actual value is negligible. In the two figures, the performance of a system based on peak detection is also shown for comparison purposes. The results have been obtained for a Lorentzian channel with PW50/2.1 μm=0.4 for the generation of the servo bursts and sampling frequency of the ADC $f_s$=15 MHz.

Optimum Detection of LPOS Symbols

As previously mentioned, servo frames allow the encoding of LPOS information, without affecting the generation of the y-position and tape velocity estimates, by shifting the transitions of the second and fourth dibit in the A and B bursts from their nominal pattern position, as illustrated in FIG. 1. Note that the modulation distance depends on the tape drive products. In an LTO product developed and sold by IBM® (such as the Model 3580), the modulation is ±0.25 μm, whereas in an IBM enterprise product (such as the Model 3592), the modulation is ±0.5 μm. In many asynchronous servo channels, the detection of LPOS information is based on the observation of the shifts of the peaks of the dibit signal samples at the servo-channel output. The measurements of the eight intervals between the dibits in the A and B bursts are labeled a through h, as illustrated in FIG. 22A for an encoded LPOS symbol equal to one. The detector performs the comparison between the measurements of the corresponding intervals according to the Table of FIG. 22B, and applies a majority decoding rule requiring that at least three out of four possible conditions be true in order to determine the encoded LPOS symbol.

The conventional approach based on peak detection and recording of peak-arrival times has the following limitations:

a) The majority decoding rule based on the measurements of intervals by taking the difference of peak-arrival times is not the optimum detection scheme for the LPOS symbols, which are encoded using pulse position modulation (PPM) techniques.

b) It is not clear how to break the tie in case two out of the four conditions listed in the table of FIG. 22 for symbol decision are satisfied, other than resorting to coin tossing.

c) There is no possibility to have a measure of reliability associated to the decisions on LPOS symbols.

The present invention still further provides for the optimum detection of LPOS symbols and concurrent monitoring of the reliability of the LPOS detection process. The method is based on the metric, which for each LPOS symbol $a_\lambda \in \{-1,+1\}$ yields the likelihood of the two hypotheses $H_{a_\lambda=-1}$ and $H_{a_\lambda=+1}$. By using the metric adopted for hypothesis testing, a measure of the signal-to-noise plus distortion ratio associated with LPOS detection is then introduced, which allows monitoring of the LPOS detection process and of the reliability of the individual LPOS symbol decisions. In particular, as in tape systems there are always available two dedicated servo channels from which LPOS information can be derived, this newly introduced reliability measure may be readily employed to determine which of the two channels provides the most reliable LPOS symbol decisions.

Recall the expressions of the dibit signal pulse (7) and of the servo channel output signal (8) and (9), as well as the formulation of the optimum receiver for the detection of waveform signals from a given set in the presence of AWGN. Observing (8) and (9), it is recognized that the encoding of LPOS symbols is obtained by applying pulse-position modulation to the second and fourth dibit of the A and B bursts. Therefore, assuming constant tape velocity, the metric associated to the likelihood of the hypothesis $H_{a_\lambda=a}$, $a \in \{-1,+1\}$ can be expressed by $$m(r \mid \alpha_\lambda = \alpha) = m_{\alpha,\lambda} \propto \int_{\lambda T_F + \frac{T_F}{2} + \frac{y}{v\tan(\pi/30)} + \frac{T_d}{2}}^{\lambda T_F + \frac{T_F}{2} + \frac{y}{v\tan(\pi/30)} + \frac{3T_d}{2}} \tag{28}$$

$$\left[r(t) - g\left(t - \lambda T_F - \frac{y}{v\tan(\pi/30)} - (1-\xi\alpha)T_d - \frac{T_F}{2}; v\right)\right]^2$$

$$dt + \int_{\lambda T_F + \frac{T_F}{2} + \frac{y}{v\tan(\pi/30)} + \frac{5T_d}{2}}^{\lambda T_F + \frac{T_F}{2} + \frac{y}{v\tan(\pi/30)} + \frac{7T_d}{2}}$$

$$\left[r(t) - g\left(t - \lambda T_F - \frac{y}{v\tan(\pi/30)} - (3+\xi\alpha)T_d - \frac{T_F}{2}; v\right)\right]^2$$

$$dt + \int_{\lambda T_F + \frac{3T_F}{4} + \frac{y}{v\tan(\pi/30)} + \frac{T_d}{2}}^{\lambda T_F + \frac{3T_F}{4} + \frac{y}{v\tan(\pi/30)} + \frac{3T_d}{2}}$$

$$\left[r(t) - g\left(t - \lambda T_F - \frac{y}{v\tan(\pi/30)} - (1-\xi\alpha)T_d - \frac{3T_F}{4}; v\right)\right]^2$$

$$dt + \int_{\lambda T_F + \frac{3T_F}{4} + \frac{y}{v\tan(\pi/30)} + \frac{5T_d}{2}}^{\lambda T_F + \frac{3T_F}{4} + \frac{y}{v\tan(\pi/30)} + \frac{7T_d}{2}}$$

$$\left[r(t) - g\left(t - \lambda T_F - \frac{y}{v\tan(\pi/30)} - (3+\xi\alpha)T_d - \frac{3T_F}{4}; v\right)\right]^2$$

$$dt.$$

Note that the metric given by (28) is equivalent to that obtained by a matched-filter receiver. Recalling now the correspondence $b_\lambda = (a_\lambda + 1)/2$, $b_\lambda \in \{0, 1\}$, introducing the change of variables $x=vt$, and defining the matched-filter waveforms $s_\beta^{(j)}(x;y)$, for $\beta=0,1$, $j=1,2$, as $$s_\beta^{(j)}(x; y) = g\left(x + (-1)^j \frac{y}{\tan(\pi/30)} - (1-\xi(2\beta-1))L_d; v=1\right) + \tag{29}$$

$$g\left(x + (-1)^j \frac{y}{\tan(\pi/30)} - (3+\xi(2\beta-1))L_d; v=1\right)$$

the expression of the metric (28) becomes $$m_{\beta,\lambda} \propto \int_{\lambda L_F + \frac{L_F}{2} + \frac{y}{\tan(\pi/30)} + \frac{L_d}{2}}^{\lambda L_F + \frac{L_F}{2} + \frac{y}{\tan(\pi/30)} + \frac{3L_d}{2}} \left[r(x) - s_\beta^{(1)}\left(x - \lambda L_F - \frac{L_F}{2}; y\right)\right]^2 dx + \tag{30}$$

$$\int_{\lambda L_F + \frac{L_F}{2} + \frac{y}{\tan(\pi/30)} + \frac{5L_d}{2}}^{\lambda L_F + \frac{L_F}{2} + \frac{y}{\tan(\pi/30)} + \frac{7L_d}{2}} \left[r(x) - s_\beta^{(1)}\left(x - \lambda L_F - \frac{L_F}{2}; y\right)\right]^2 dx +$$

$$\int_{\lambda L_F + \frac{3L_F}{4} + \frac{y}{\tan(\pi/30)} + \frac{L_d}{2}}^{\lambda L_F + \frac{3L_F}{4} + \frac{y}{\tan(\pi/30)} + \frac{3L_d}{2}} \left[r(x) - s_\beta^{(2)}\left(x - \lambda L_F - \frac{3L_F}{4}; y\right)\right]^2 dx +$$

$$\int_{\lambda L_F + \frac{3L_F}{4} + \frac{y}{\tan(\pi/30)} + \frac{5L_d}{2}}^{\lambda L_F + \frac{3L_F}{4} + \frac{y}{\tan(\pi/30)} + \frac{7L_d}{2}} \left[r(x) - s_\beta^{(2)}\left(x - \lambda L_F - \frac{3L_F}{4}; y\right)\right]^2 dx.$$

Note that the expression of the metric (30) is independent of the tape velocity. Recall that the timing basis generation system provides the sequence of time instants $\{t_n\}$ such that the interpolated signal samples $\{r(t_n)\}$ are obtained at the fixed rate of $1/x_i$ samples per micrometer, independent of tape velocity. Therefore, assuming that the sampling rate is sufficiently large to avoid aliasing effects, and that $N_F = L_F/x_i$ is an integer number, the metric may be computed in the digital domain using the interpolated signal samples as $$m_{\beta,\lambda} \propto \sum_{n-\lambda N_F - \frac{N_F}{2} \in \mathfrak{I}_1(y)} \left[r(t_n) - s_\beta^{(1)}\left(\left(n - \lambda N_F - \frac{N_F}{2}\right)x_i; y\right)\right]^2 + \tag{31}$$

$$\sum_{n-\lambda N_F - \frac{N_F}{2} \in \mathfrak{I}_2(y)} \left[r(t_n) - s_\beta^{(1)}\left(\left(n - \lambda N_F - \frac{N_F}{2}\right)x_i; y\right)\right]^2 +$$

$$\sum_{n-\lambda N_F - \frac{3N_F}{4} \in \mathfrak{I}_3(y)} \left[r(t_n) - s_\beta^{(2)}\left(\left(n - \lambda N_F - \frac{3N_F}{4}\right)x_i; y\right)\right]^2 +$$

$$\sum_{n-\lambda N_F - \frac{3N_F}{4} \in \mathfrak{I}_4(y)} \left[r(t_n) - s_\beta^{(3)}\left(\left(n - \lambda N_F - \frac{3N_F}{4}\right)x_i; y\right)\right]^2,$$

where $\mathfrak{I}_i(y)$, $i=1, 2, 3, 4$, denote sets of integer numbers that are defined as $$\mathfrak{I}_1(y) = \left\{n : nx_i \in \left(\frac{y}{\tan(\pi/30)} + \frac{L_d}{2}, \frac{y}{\tan(\pi/30)} + \frac{3L_d}{2}\right)\right\}, \tag{32}$$

$$\mathfrak{I}_2(y) = \left\{n : nx_i \in \left(\frac{y}{\tan(\pi/30)} + \frac{5L_d}{2}, \frac{y}{\tan(\pi/30)} + \frac{7L_d}{2}\right)\right\},$$

$$\mathfrak{I}_3(y) = \left\{n : nx_i \in \left(-\frac{y}{\tan(\pi/30)} + \frac{L_d}{2}, -\frac{y}{\tan(\pi/30)} + \frac{3L_d}{2}\right)\right\},$$

$$\mathfrak{I}_4(y) = \left\{n : nx_i \in \left(-\frac{y}{\tan(\pi/30)} + \frac{5L_d}{2}, -\frac{y}{\tan(\pi/30)} + \frac{7L_d}{2}\right)\right\}.$$

An optimum LPOS symbol detector 2300 of the present invention computes the values $m_{\beta,\lambda}$, $\beta=0,1$, and compares them to produce a decision $\hat{b}_\lambda$ on the LPOS symbol encoded in the $\lambda$-th servo frame, as illustrated in FIG. 23, i.e.:

$$\hat{b}_\lambda = \begin{cases} 0, & \text{if } m_{0,\lambda} \leq m_{1,\lambda} \\ 1, & \text{otherwise.} \end{cases} \quad (33)$$

Figure 24A:
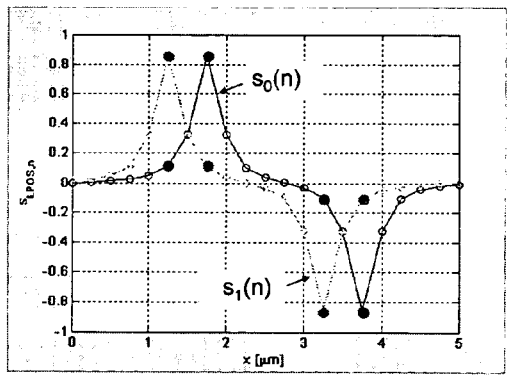
FIGS. 24A and 24B are plots of matched-filter waveforms for metric computation in second and fourth dibit in A, B bursts, respectively.
Figure 24B:
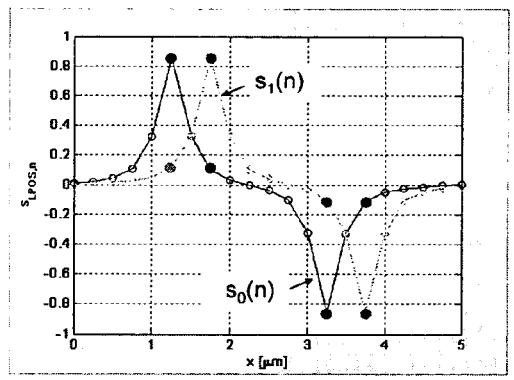

The waveforms $s_\beta^{(j)}(x;y)$, $\beta=0,1$, are shown in FIG. 24 for PW50=0.84 μm, y=0, and $x_i$=0.25 μm.

It turns out that the complexity required for the metric computation can be significantly reduced by considering a subset of the indices specified by the sets $\mathfrak{I}_i(y)$, i=1, 2, 3, 4, to perform the summations in (31). In particular, an approximation of the metric (31), which provides reliable LPOS symbol decisions, is obtained by considering only the four indices in each set that correspond to the maximum absolute values of the waveforms $s_\beta^{(j)}(x;y)$, for $\beta=0,1$, j=1,2. The subsets of the indices of $\mathfrak{I}_i(y)$, i=1, 2, 3, 4, that are considered for metric computation are then given by $$\mathfrak{I}_1(y) = \left\{ n : nx_i \approx \frac{y}{\tan(\pi/30)} + (1 \pm \xi)L_d - \frac{L_p}{2}, \frac{y}{\tan(\pi/30)}(1 \pm \xi)L_d + \frac{L_p}{2} \right\},$$

$$\mathfrak{I}_2(y) = \left\{ n : nx_i \approx \frac{y}{\tan(\pi/30)} + (3 \pm \xi)L_d - \frac{L_p}{2}, \frac{y}{\tan(\pi/30)} + (3 \pm \xi)L_d + \frac{L_p}{2} \right\},$$

$$\mathfrak{I}_3(y) = \left\{ n : nx_i \approx -\frac{y}{\tan(\pi/30)} + (1 \pm \xi)L_d \frac{L_p}{2}, -\frac{y}{\tan(\pi/30)} + (1 \pm \xi)L_d + \frac{L_p}{2} \right\},$$

$$\mathfrak{I}_4(y) = \left\{ n : nx_i \approx -\frac{y}{\tan(\pi/30)} + (3 \pm \xi)L_d - \frac{L_p}{2}, -\frac{y}{\tan(\pi/30)} + (3 \pm \xi)L_d + \frac{L_p}{2} \right\},$$

(34)

where $L_p$=2.1 μm denotes the distance between the positive and negative peak of a dibit. For example, the samples of the waveforms $s_\beta^{(1)}(x;y)$, $\beta=0,1$, that are considered for the computation of the approximation of the metric (31) are indicated by larger markers in FIGS. 24A and 24B.

Figure 25:
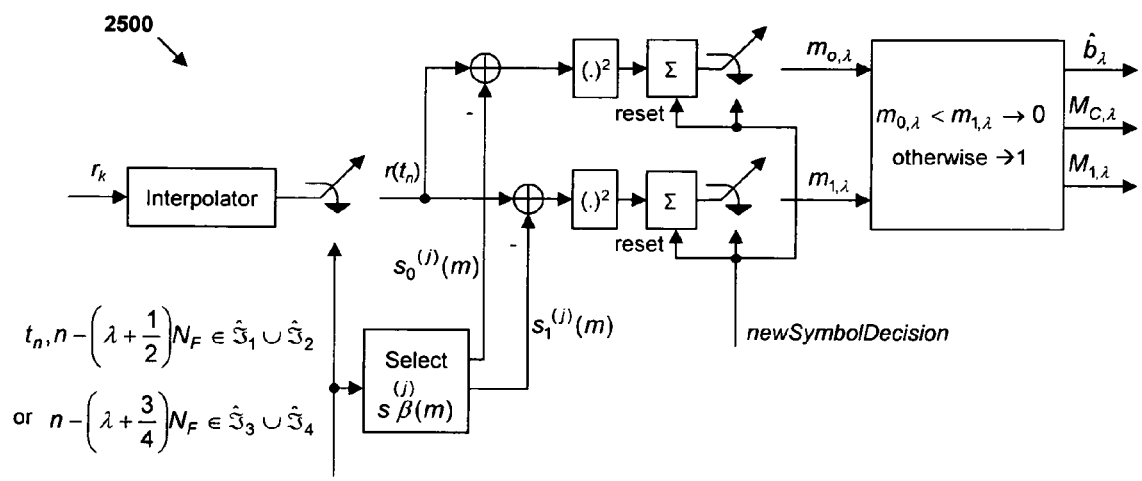
FIG. 25 illustrates a block diagram of a simplified LPOS symbol detection system.

A block diagram of a simplified LPOS symbol detection system 2500 is depicted in FIG. 25. The values of the sixteen interpolation instants per frame $\{t_n\}$, at which the terms contributing to the metric are evaluated, see (34), are provided by the "Control unit" 1304, which has complete timing information concerning the dibits in the bursts of a servo frame, as previously discussed. The knowledge about the instants $\{t_n\}$ also allows the proper selection of the samples of the matched-filter waveforms, as indicated in the block diagram of FIG. 25. At each time instant $t_n$ determined by the "Control unit" 1304, an interpolated signal sample is computed, from which the selected waveform samples $s_\beta^{(j)}(m;y)$, $\beta=0,1$, are subtracted. The resulting differences are squared and accumulated to form the two metric values $m_{\beta,\lambda}$, $\beta=0,1$. When the variable newSymbolDecision is set to 1 by the "Control unit" 1304 at the end of the summation interval, which occurs at the end of the fourth dibit of a B burst, a new LPOS symbol is detected according to the rule (33), and the accumulators are reset. The low and the high metric values, denoted by $M_{C,\lambda}$ and $M_{I,\lambda}$ and assumed to indicate the metric for the correct and the incorrect hypothesis, respectively, are also presented at the output of the detection system for further processing to determine a reliability measure of the LPOS detection process.

Figure 26A:
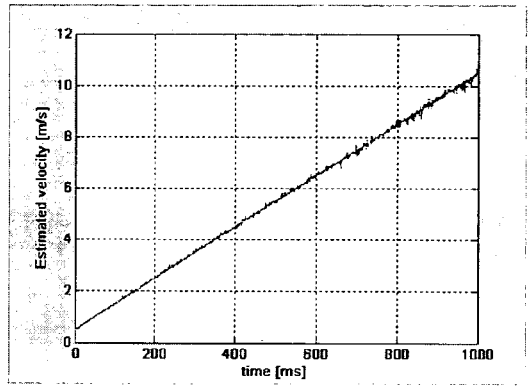
FIGS. 26A and 26B are plots of estimated velocity and computed metric values, respectively, during tape acceleration.
Figure 26B:
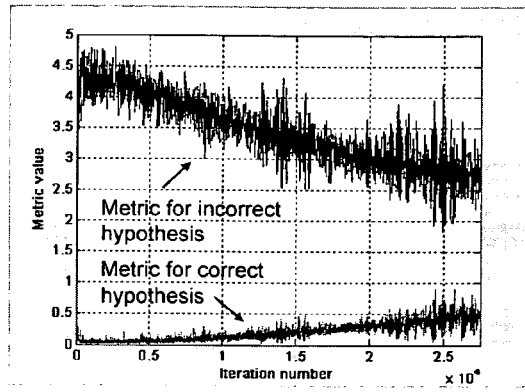

The expression of the metric (31) has been derived under the assumption of constant tape velocity. As previously discussed, however, velocity estimates are input to the timing basis generation system 1300 to track time-varying velocity. Therefore reliable LPOS symbol decisions are obtained even during acceleration and deceleration of the tape motion. FIGS. 26A and 26B illustrate simulation results giving the estimated velocity (FIG. 26A) and the computed metric values (FIG. 26B) during tape acceleration, for an AWGN servo channel characterized by SNR equal to 25 dB, initial tape velocity equal to 0.5 m/s, and tape acceleration equal to 10 m/s².

To determine the quality of the detection process, an average signal-to-noise plus distortion ratio at the detection point is defined. Introducing the quantities $M_C$ and $\sigma_{M_C}^2$ to denote the mean and the variance of the metric for the correct hypothesis, respectively, and $M_I$ and $\sigma_{M_I}^2$ to denote the mean and the variance of the metric for the incorrect hypothesis, respectively, the average signal-to-noise plus distortion ratio at the detection point is defined as $$SDR_{est,\lambda} = 20\log\left(\frac{|M_I - M_C|}{\sqrt{\sigma_{M_I}^2 + \sigma_{M_C}^2}}\right). \quad (35)$$

A measure of the reliability associated with the LPOS symbol decision is given by $$REL_{est,\lambda} = 20\log\left(\frac{|M_{I,\lambda} - M_{C,\lambda}|}{\sqrt{\sigma_{M_I}^2 + \sigma_{M_C}^2}}\right). \quad (36)$$

Figure 27:
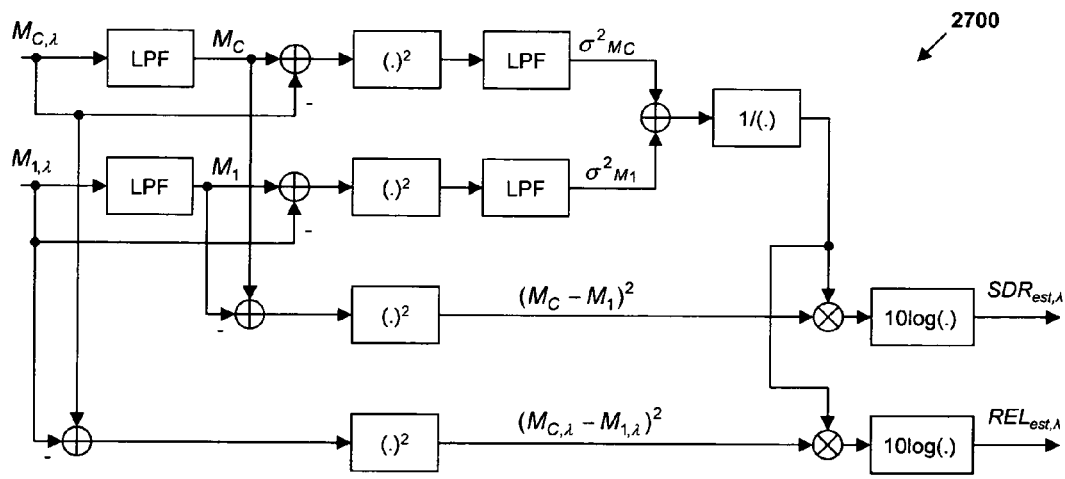
FIG. 27 illustrates a block diagram of a system for the generation of SDR and symbol decision reliability estimates.

A block diagram of a system 2700 for the generation of estimates of the average signal-to-noise plus distortion ratio and of the reliability of each LPOS symbol decision is depicted in FIG. 27. As mentioned above, $SDR_{est,\lambda}$ and $REL_{est,\lambda}$ may be employed for monitoring of the LPOS detection process and for selecting the most reliable of the LPOS symbols detected by two servo channels operating in parallel, respectively.

The performance of a prototype LPOS symbol detector based on a synchronous servo channel has been measured and compared with that of a conventional LPOS symbol detector based on peak detection, as currently used in LTO tape-drive products. The synchronous servo channel and the TBS system have been implemented by employing an FPGA and run in parallel by using the signal at the output of a tape-drive servo channel ADC as an input for both systems. Identical LPOS word decoders have been employed to decode the sequence of LPOS symbols and measure the number of decision errors in the two channels, without applying error correction. The two physical servo channels CHA and CHB, usually providing servo information during normal tape-drive operation, were read by the servo readers for a tape velocity equal to 6.22 m/s, at 12 different lateral positions on the tape, indicated by wrap numbers. Measurements of the number of LPOS word errors were obtained by reading 80000 LPOS words per wrap, and repeated for each wrap. The results are reported in Table I.

TABLE I

Performance comparison between TBS and synchronous servo systems.

|  | # Errors for TBS system | | | | # Errors for synchronous servo system | | | |
| --- | --- | --- | --- | --- | --- | --- | --- | --- |
| wrap | CHA/Mes1 | CHA/Mes2 | CHB/Mes1 | CHB/Mes2 | CHA/Mes1 | CHA/Mes2 | CHB/Mes1 | CHB/Mes2 |
| 0 | 13 | 18 | 3 | 4 | 0 | 0 | 0 | 0 |
| 6 | 13 | 13 | 7 | 4 | 0 | 0 | 0 | 0 |
| 12 | 10 | 13 | 6 | 6 | 1 | 1 | 0 | 0 |
| 18 | 9 | 7 | 6 | 4 | 1 | 1 | 0 | 0 |
| 24 | 4 | 6 | 7 | 6 | 0 | 0 | 0 | 0 |
| 26 | 8 | 7 | 8 | 6 | 0 | 0 | 1 | 0 |
| 30 | >10000 | >10000 | >10000 | >10000 | 1 | 0 | 1 | 1 |
| 32 | 9 | 9 | 7 | 9 | 0 | 0 | 0 | 0 |
| 44 | 12 | 10 | 8 | 10 | 0 | 0 | 0 | 0 |
| 46 | >10000 | (10260) |  |  | 0 | 0 |  |  |
| 50 | 8 | 14 | 5 | 5 | 0 | 0 | 1 | 1 |
| 60 | 11 | 9 | 6 | 8 | 0 | 0 | 0 | 0 |
| Number of errors | 328 | | | | 7 | | | |
| Error rate | 1.025 e-4 | | | | 2.19 e-6 | | | |

Note that the total number of errors does not take into account the results obtained from wrap #30 and wrap #46, as in those cases synchronization errors were preventing the TBS system from operating satisfactorily. In particular, the TBS system synchronization errors were due to the failure of the gap detector at the servo band edges. The comparison between the total numbers of errors for the two systems under normal operating conditions indicates that the LPOS detection system based on the synchronous servo channel architecture achieves an error rate that is about 47 times better than the one exhibited by the LPOS detection system based on TBS. Although the results shown in Table I have been obtained by a particular tape drive and a particular cartridge, it is expected that in general the difference in performance between the two systems would not differ substantially from the one shown here.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for longitudinal position (LPOS) detection in a magnetic tape storage system.

What is claimed is:

1. A method for longitudinal position (LPOS) detection in a magnetic tape storage system, comprising:
    operating a magnetic tape storage system whereby a magnetic tape is passed longitudinally across a servo reader at a velocity, the tape including recorded servo burst patterns embedded with LPOS information;
    establishing a predetermined fixed sampling rate defined in terms of samples per unit of tape length passing across the servo reader;
    generating a servo channel output signal from the servo reader;
    generating a clock at a nominal frequency;
    sampling the servo channel output signal with an analog-to-digital converter (ADC) at the nominal clock frequency;
    interpolating the servo channel output signal samples from the ADC;

generating a sequence of interpolated signal samples at the fixed sampling rate independent of the velocity of the tape; and generating an LPOS signal from the sequence of interpolated signal samples.

2. The method of claim 1, wherein generating the LPOS signal comprises:

obtaining timing-based servo bursts; and measuring a distance between zero crossing of individual dibits to generate a position error signal.

3. The method of claim 2, wherein the LPOS signal is generated during periods of changing and constant tape velocity.

4. The method of claim 3, wherein an approximate maximum velocity for LPOS detection is represented by $v_{max}=L_p*(f_s/2)$, where $L_p$ is a minimum distance between magnetic transitions in the servo burst pattern, expressed in μm, and $f_s$ is the fixed sampling rate, expressed in MHz.

5. A computer program product of a computer readable medium usable with a programmable computer, the computer program product having computer-readable code embodied therein for longitudinal position (LPOS) detection in a magnetic tape storage system, the computer-readable code comprising instructions for:

operating a magnetic tape storage system whereby a magnetic tape is passed longitudinally across a servo reader at a velocity, the tape including recorded servo burst patterns embedded with LPOS information;

establishing a predetermined fixed sampling rate defined in terms of samples per unit of tape length passing across the servo reader;

generating a servo channel output signal from the servo reader;

generating a clock at a nominal frequency;

sampling the servo channel output signal with an analog-to-digital converter (ADC) at the nominal clock frequency;

interpolating the servo channel output signal samples from the ADC;

generating a sequence of interpolated signal samples at the fixed sampling rate independent of the velocity of the tape; and generating an LPOS signal from the sequence of interpolated signal samples.

6. The computer program product of claim 5, wherein the instructions for generating the LPOS signal comprise instructions for:

obtaining timing-based servo bursts; and measuring a distance between zero crossing of individual dibits to generate a position error signal.

7. The computer program product of claim 6, wherein the LPOS signal is generated during periods of changing and constant tape velocity.

8. The computer program product of claim 7, wherein an approximate maximum velocity for LPOS detection is represented by $v_{max}=L_p*(f_s/2)$, where $L_p$ is a minimum distance between magnetic transitions in the servo burst pattern, expressed in μm, and $f_s$ is the fixed sampling rate, expressed in MHz.

9. A synchronous longitudinal position (LPOS) detection system for a magnetic data storage tape, comprising:

a clock generating a clock signal at a nominal frequency;

means for establishing a predetermined fixed sampling rate defined in terms of samples per unit of tape length passing longitudinally across a servo reader, the tape including recorded servo burst patterns embedded with LPOS information;

an analog-to-digital converter (ADC), comprising:

an input coupled to receive the clock signal;

an input coupled to receive a servo channel output signal from the servo reader;

means for sampling the servo channel output signal at the nominal clock frequency; and means for outputting servo signal samples;

a timing basis generator having an input coupled to receive the clock signal;

a burst interpolator, responsive to the timing basis generator and comprising:

a first input coupled to receive the servo signal samples from the ADC; and means for interpolating the servo signal samples at the fixed sampling rate independent of the velocity of the tape and ouputing a sequence of interpolated signal samples; and an LPOS detector comprising:

an input coupled to receive the sequence of interpolated signal samples from the burst interpolator;

a first output coupled to transmit a control signal to a second input of the burst interpolator; and means for generating an LPOS output signal from the sequence of interpolated signal samples.

10. The LPOS detection system of claim 9, wherein the means for generating the LPOS output signal comprises means for measuring a distance between zero crossing of individual dibits.

11. The LPOS detection system of claim 10, wherein the LPOS output signal is generated during periods of changing and constant tape velocity.

12. The LPOS detection system of claim 11, wherein an approximate maximum velocity for LPOS detection is represented by $v_{max}=L_p*(f_s/2)$, where $L_p$ is a minimum distance between magnetic transitions in the servo burst pattern, expressed in μm, and $f_s$ is the fixed sampling rate, expressed in MHz.

* * * * *